United States Patent
Osman et al.

(10) Patent No.: US 12,512,276 B2
(45) Date of Patent: Dec. 30, 2025

(54) ZINC-ION HYBRID SUPERCAPACITOR AND METHODS OF PREPARATION THEREOF

(71) Applicant: KING FAHD UNIVERSITY OF PETROLEUM AND MINERALS, Dhahran (SA)

(72) Inventors: Mostafa Mahmoud Mohamed Osman, Dhahran (SA); Md. Abdul Aziz, Dhahran (SA); Zain Hassan Yamani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 163 days.

(21) Appl. No.: 18/625,293

(22) Filed: Apr. 3, 2024

(65) Prior Publication Data
US 2025/0316424 A1   Oct. 9, 2025

(51) Int. Cl.
| | |
|---|---|
| *H01G 11/26* | (2013.01) |
| *H01G 11/34* | (2013.01) |
| *H01G 11/52* | (2013.01) |
| *H01G 11/62* | (2013.01) |
| *H01G 11/86* | (2013.01) |

(52) U.S. Cl.
CPC .............. *H01G 11/34* (2013.01); *H01G 11/26* (2013.01); *H01G 11/52* (2013.01); *H01G 11/62* (2013.01); *H01G 11/86* (2013.01)

(58) Field of Classification Search
CPC ........ H01G 11/34; H01G 11/26; H01G 11/52; H01G 11/62; H01G 11/86; H01G 11/28; H01G 11/36; H01G 11/38; Y02E 60/13
See application file for complete search history.

(56) References Cited

U.S. PATENT DOCUMENTS

| | | | |
|---|---|---|---|
| 10,381,645 B2 | 8/2019 | Li et al. | |
| 11,387,456 B2 | 7/2022 | Zhi et al. | |
| 2024/0395472 A1* | 11/2024 | Polycarpou | H01G 11/26 |
| 2025/0149262 A1* | 5/2025 | Shah | H01G 11/24 |
| 2025/0316424 A1* | 10/2025 | Osman | H01G 11/52 |

FOREIGN PATENT DOCUMENTS

| | | | |
|---|---|---|---|
| IN | 394477 | 8/2018 | |
| KR | 10-2416349 | 7/2022 | |
| KR | 20240041676 A * | 4/2024 | ...... H01G 11/32 |
| KR | 20250047070 A * | 4/2025 | ...... C01B 32/20 |
| WO | 2022/000070 A1 | 1/2022 | |

OTHER PUBLICATIONS

Translation of KR '676 (Year: 2024).*

(Continued)

*Primary Examiner* — Dion R. Ferguson
(74) *Attorney, Agent, or Firm* — Oblon, McClelland, Maier & Neustadt, L.L.P.

(57) ABSTRACT

A zinc (Zn) ion hybrid supercapacitor (ZIHSC) in the form of an electrochemical cell includes a Zn nanosheets electrodeposited metal substrate (Zn ED-MS) as an anode, and a jute activated carbon coated conductive carbon substrate (the JAC-CCS) as a cathode, an electrolyte including an aqueous solution of Zn salt at a concentration of 0.05 to 5 molars (M), and a membrane as a separator.

20 Claims, 26 Drawing Sheets

Jute carbon on graphite foil

Zn electrodeposition on steel mesh

(56) References Cited

OTHER PUBLICATIONS

Translation of KR '070 (Year: 2025).*
Rauf et al. ; Facile hydrothermal synthesis of zinc sulfide nanowires for high-performance asymmetric supercapacitor ; Journal of Saudi Chemical Society, 26 ; Jun. 22, 2022 ; 13 Pages.
Shinde et al. ; Surface modified zinc ferrite as a carbon-alternative negative electrode for high-energy hybrid supercapacitor ; Ceramics International, vol. 47, Issue 11 ; Apr. 17, 2021 ; 3 Pages.

* cited by examiner

ZINC-ION HYBRID SUPERCAPACITOR AND METHODS OF PREPARATION THEREOF

STATEMENT OF ACKNOWLEDGEMENT

Support provided by the Interdisciplinary Research Center for Hydrogen and Energy Storage (IRC-HES) under Project INHE-2311, and by the Interdisciplinary Research Center for Renewable Energy and Power Systems (IRC-REPS) under Project CREP2522, at King Fahd University of Petroleum and Minerals (KFUPM) is gratefully acknowledged.

BACKGROUND

Technical Field

The present disclosure is directed to a supercapacitor, and more particularly, to a zinc (Zn) ion hybrid supercapacitor (ZIHSC) in the form of an electrochemical cell.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

The increasing demand for energy storage devices capable of storing and delivering substantial power and energy densities, coupled with prolonged lifetimes, has become paramount across various applications, including electronics and electric vehicles. As technological advancements continue to shape the modern world, the need for efficient energy storage solutions has become crucial. Lithium-ion batteries and other electrochemical energy storage devices using organic electrolytes play a pivotal role in modern society. However, these energy storage systems often come with high costs and safety concerns due to the flammability associated with organic electrolytes. Additionally, the limited availability and uneven distribution of metallic lithium have spurred the search for alternative energy storage systems based on different cations. These alternative cations, such as aluminum ($Al^{3+}$), magnesium ($Mg^{2+}$), zinc ($Zn^{2+}$), potassium ($K^+$), calcium ($Ca^{2+}$), and sodium ($Na^+$) emerging hybrid capacitors offer the benefits of low cost and great security, high energy density and a quick charging rate due to the benefits of combining supercapacitors and batteries with multiple valent metal ions. Whenever divalent or trivalent metal ions are utilized as charge carriers, it only takes half or a third as many ions of metal are desired to achieve the equivalent capacity for the comparable transporters of monovalent ions.

Among these alternatives, aqueous zinc ion hybrid supercapacitors (ZIHSCs) have attracted interest and are emerging as promising energy storage devices. They present a viable alternative solution owing to their non-flammability, low toxicity, and ability to provide an elevated standard of safety. The bulk of ZIHSCs systems at the time employed capacitor-type carbon cathodes and metal Zn anodes for batteries coated with aqueous Zn salt solutions after being stripped of their protective coating. The electrical double-layer storage method produces low specific capacitances yet quick kinetics for the carbon-based electrodes used in ZIHSC cathodes. Pseudocapacitive cathodes have recently been developed to boost the cathodes' capacitance in ZIHSCs (See: Y. Lu, Z. Li, Z. Bai, H. Mi, C. Ji, H. Pang, C. Yu, J. Qiu, *High energy-power Zn-ion hybrid supercapacitors enabled by layered B/N co-doped carbon cathode, Nano Energy* 66 (2019) 104132., Q. Yang, Z. Huang, X. Li, Z. Liu, H. Li, G. Liang, D. Wang, Q. Huang, S. Zhang, S. Chen, *A wholly degradable, rechargeable Zn-Ti3C2 MXene capacitor with superior anti-self-discharge function, ACS nano* 13(7) (2019) 8275-8283). All the ZIHSCs mentioned above use Zn metal anodes. Dendrites would develop at the Zn metal due to the uneven stripping and plating. Poor cycle stability and insufficient energy efficiency of ZISHCs may result from Zn dendrite proliferation. Particularly, the excessive growth of Zn dendrites has the potential to readily cross the interelectrode gap and puncture the device's separators, leading to short circuits, low efficiency, and a short cycle lifetime.

Therefore, there is a need for the development of ZIHSCs based on transition metals that possess the ability to facilitate rapid charge-discharge rates, exhibit high specific power, and offer a high specific energy.

Accordingly, it is one object of the present disclosure to provide a ZIHSCs in the form of an electrochemical cell. The fabricated ZIHSCs shows an enhanced efficiency. A second object of the present disclosure is to provide a method of making the ZIHSC. The method includes a step of making a Zn nanosheets electrodeposited metal substrate (Zn ED-MS), and a step of making a jute activated carbon coated conductive carbon substrate (JAC-CCS).

SUMMARY

In an exemplary embodiment, a zinc (Zn) ion hybrid supercapacitor (ZIHSC) is described. The ZIHSC is in the form of an electrochemical cell. The ZIHSC electrochemical cell includes a Zn nanosheets electrodeposited metal substrate (Zn ED-MS) as an anode and a jute activated carbon coated conductive carbon substrate (the JAC-CCS) as a cathode. The ZIHSC electrochemical cell further includes an electrolyte containing an aqueous solution of a Zn salt at a concentration of 0.05 to 5 molars (M). The ZIHSC further includes a membrane as a separator. In some embodiments, the membrane separates the anode from the cathode.

In some embodiments, the Zn ED-MS includes a metal substrate and hexagon-shaped Zn nanosheets at least partially covering a surface of the metal substrate.

In some embodiments, the metal substrate is at least one selected from the group consisting of an aluminum substrate, a nickel substrate, a titanium substrate, a titanium alloy substrate, an aluminum alloy substrate, a magnesium alloy substrate, a nickel alloy substrate, and a steel substrate.

In some embodiments, the hexagon-shaped Zn nanosheets have an average thickness of 5 to 150 nanometers (nm). In some embodiments, the hexagon-shaped Zn nanosheets have an average length of 3 to 7 micrometers (μm) in a longest dimension.

In some embodiments, the hexagon-shaped Zn nanosheets present in the Zn ED-MS are in form of a multilayered structure that are uniformly deposited on the surface of the metal substrate.

In some embodiments, the JAC-CCS includes a conductive carbon substrate and a jute activated carbon (the JAC) composition at least partially covering a surface of the conductive carbon substrate.

In some embodiments, the conductive carbon substrate is at least one selected from the group consisting of a graphite substrate, an acetylene black substrate, and a graphene substrate.

In some embodiments, the JAC composition includes about 65 to 85 wt. % of jute activated carbon (JAC) having an amorphous structure; about 5 to 25 wt. % of carbon black; and about 5 to 15 wt. % of a polymer binder, each wt. % based on a total weight of the JAC composition.

In some embodiments, the polymer binder is at least one selected from the group consisting of a styrene butadiene rubber, a polyvinylidene fluoride (PVDF), and a polyvinylidene fluoride copolymer.

In some embodiments, the JAC composition includes about 75 wt. % of the JAC; about 15 wt. % of carbon black; and about 10 wt. % of a polyvinylidene fluoride, each wt. % based on the total weight of the JAC composition.

In some embodiments, the Zn salt is present in the electrolyte at a concentration of about 2 M.

In some embodiments, the Zn salt includes zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate.

In some embodiments, the membrane is a microporous polymeric membrane selected from the group consisting of a polyethylene membrane, a polypropylene membrane, and a polyvinyl chloride (PVC) membrane.

In some embodiments, the ZIHSC has an energy density of 98 to 118 watt-hours per kilogram (Wh/kg). In some embodiments, the ZIHSC has a power density of 70 to 90 watts per kilogram (W/kg). In some embodiments, the ZIHSC has a specific capacitance of about 280 to 325 farads per gram (F/g), each measured at a current density of about 0.1 amperes per gram (A/g).

In some embodiments, after subjecting to about 10,000 cycles of charging and discharging at a current density of about 5 A/g, the ZIHSC has a capacity retention rate of about 94% based on an initial capacity of the ZIHSC.

In another exemplary embodiment, a method of making the ZIHSC includes a step of preparing the Zn ED-MS anode. The step of preparing the Zn ED-MS anode includes charging the electrolyte including the Zn salt to an electrochemical cell including a working electrode, a counter electrode, and a reference electrode. In some embodiments, the working electrode is a metal substrate. The step further includes immersing the metal substrate into the electrolyte and applying a potential between the metal substrate and the counter electrode in the electrochemical cell via the electrolyte to form Zn nanosheets deposited on a surface of the metal substrate. The step further involves removing the metal substrate including the Zn nanosheets from the electrolyte, washing, and drying.

In some embodiments, the electrolyte further includes a sodium salt, and a boric acid.

In some embodiments, the metal substrate is a steel mesh, and wherein the Zn ED-MS is a Zn nanosheets electrodeposited steel substrate (the Zn ED-SS).

In yet another exemplary embodiment, the method of making the ZIHSC further includes a step of preparing the JAC-CCS cathode. The step of preparing the JAC-CCS cathode includes mixing jute powder, a base, and water to form a first mixture. The step includes calcinating the first mixture at a temperature of about 800° C. to form a second mixture. The step further includes washing the second mixture and drying to form the JAC in the form of particles and dispersing the particles of the JAC, carbon black, and a polymer binder in a solvent and mixing to form a slurry. Furthermore, the step involves applying the slurry on a surface of a conductive carbon substrate, and drying to form a sample, and drying the sample.

In some embodiments, the polymer binder is a polyvinylidene fluoride (PVDF), and the conductive carbon substrate is a graphite substrate (GrF). In some embodiments, the JAC-CCS is a jute activated carbon coated conductive carbon substrate (the JAC-GrF).

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
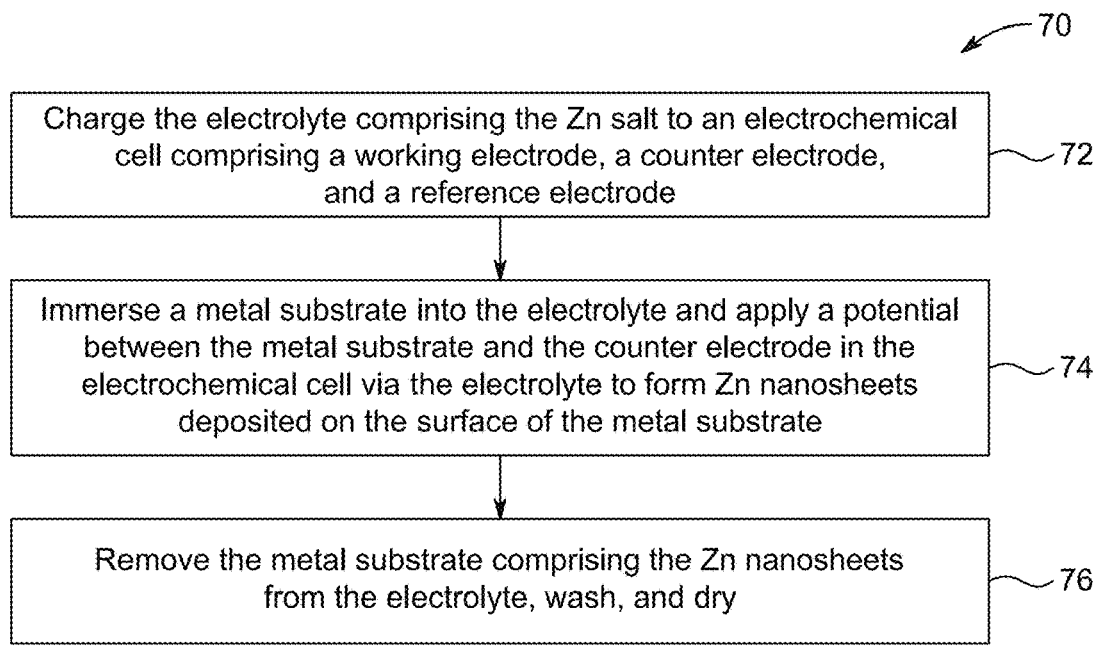
FIG. 1A is a flowchart depicting a method for making zinc (Zn) nanosheets electrodeposited metal substrate (Zn ED-MS), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of naturally occurring zinc include 64Zn, 66Zn, 67Zn, 68Zn, and 70Zn.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The use of the terms "include," "includes", "including," "have," "has," or "having" should be generally understood as open-ended and non-limiting unless specifically stated otherwise.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" or "ambient temperature" generally refers to a temperature in a range of 25 degrees Celsius (° C.)±3° C. in the present disclosure.

As used herein, "nanoparticles" are particles having a particle size of 1 nm to 500 nm within the scope of the present invention.

As used herein, the term "electrolyte" is a substance that forms a solution that can conduct electricity when dissolved in a polar solvent.

As used herein, "particle size" and "pore size" may be thought of as the lengths or longest dimensions of a particle and of a pore opening, respectively.

As used herein, the term "electrode" generally refers to an electrical conductor used to contact a non-metallic part of a circuit e.g., a semiconductor, an electrolyte, a vacuum, or air.

As used herein, the term "current density" generally refers to the amount of electric current traveling per unit cross-section area.

As used herein, the term "Tafel slope" generally refers to the relationship between the overpotential and the logarithmic current density.

As used herein, the term "electrochemical cell" generally refers to a device capable of either generating electrical energy from chemical reactions or using electrical energy to cause chemical reactions.

As used herein, the term "overpotential" generally refers to the difference in potential that exists between a thermodynamically determined reduction potential of a half-reaction and the potential at which the redox event is experimentally observed. The term is directly associated with a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

As used herein, the term "capacitance" generally refers to the capability of a material/device to store electric charge.

As used herein, the term "energy density" generally refers to the amount of energy stored in a supercapacitor per unit volume of supercapacitor.

As used herein, the term "power density" generally refers to the measure of power output per unit volume.

The present disclosure is intended to include all hydration states of a given compound or formula, unless otherwise noted or when heating a material.

Aspects of the present disclosure are directed to aqueous zinc ion hybrid supercapacitors (ZIHSCs). ZIHSCs include a Zn nanosheets electrodeposited on steel mesh (Zn ED-SS) as the anode and a jute activated carbon (JAC) with a porous surface as the cathode material. The incorporation of Zn nanosheets may increase the surface area and active sites, thereby enhancing the electrochemical performance of the ZIHSC device. The assembled Zn electrodeposition on stainless steel and jute-activated carbon on graphite foil hybrid supercapacitor may offer high energy densities.

A supercapacitor is described. The supercapacitor is a zinc (Zn) ion hybrid supercapacitor (ZIHSC) in the form of an electrochemical cell. The supercapacitor includes an anode, a cathode, an electrocatalyst, and a membrane. In some embodiments, the ZIHSC includes a Zn nanosheets electrodeposited metal substrate (Zn ED-MS) as anode. The Zn ED-MS further includes a metal substrate. The metal substrate is at least one selected from the group consisting of an aluminum substrate, a nickel substrate, a titanium substrate, a titanium alloy substrate, an aluminum alloy substrate, a magnesium alloy substrate, a nickel alloy substrate, and a steel substrate. In a specific embodiment, the metal substrate is a steel substrate including but not limited to stainless steel, mild steel, and carbon steel. In a most preferred embodiment, the metal substrate is stainless steel. Stainless steel is a corrosion-resistant iron alloy primarily composed of iron and chromium. It is durable, low maintenance, and can withstand high temperatures. The Zn ED-MS also includes a hexagon-shaped Zn nanosheets at least partially covering a surface of the metal substrate. In some embodiments, the metal substrate is in the form of a sheet having two sides. In some embodiments, only one side of the metal substrate is covered by the hexagon-shaped Zn nanosheets. In some embodiments, at least 50% of a total surface area of the metal substrate is covered by the hexagon-shaped Zn nanosheets, preferably at least 60%, preferably at least 70%, preferably at least 80%, preferably at least 90%, or even more preferably at least 99% of the total surface area of the metal substrate is covered by the hexagon-shaped Zn nanosheets. Other ranges are also possible. In an alternate embodiment, the Zn ED-MS may include Zn nanoparticles in different shapes, such as cones, cuboidal, rectangular, pyramidical, cylindrical, wires, crystals, rectangles, triangles, prisms, disks, cubes, ribbons, blocks, beads, discs, barrels, granules, whiskers, flakes, foils, powders, boxes, stars, flowers, polygonal like trigonal, pentagonal, etc., and mixtures thereof. In a preferred embodiment, Zn nanoparticles exist as nanosheets. The hexagon-shaped Zn nanosheets have an average thickness of 5-150 nanometers (nm), preferably 15-140 nm, preferably 25-130 nm, preferably 35-120 nm, preferably 45-110 nm, preferably 55-100 nm, preferably 65-90 nm, and preferably 75-80 nm. In some embodiments, the hexagon-shaped Zn nanosheets have an average length of 1 to 15 micrometers (μm), preferably 2 to 10 μm, preferably 3 to 7 μm, and even more preferably 4-6 μm in the longest dimension. Other ranges are also possible. The hexagon-shaped Zn nanosheets are present in the Zn ED-MS in the form of a multilayered structure that is uniformly deposited on the surface of the metal substrate.

In some embodiments, the ZIHSC includes a jute activated carbon coated conductive carbon substrate (the JAC-CCS) as a cathode. In some embodiments, the JAC-CCS includes a conductive carbon substrate and a jute activated carbon (the JAC) composition at least partially covering a surface of the conductive carbon substrate. In some embodiments, jute is a natural fiber mainly grown in Asian countries. It is extracted from the plant by the retting process and has high tensile properties and biodegradability. Jute fiber has been used for packaging applications and has new market opportunities in composites, paper, geotextiles, agro-textiles, and lifestyle products.

The conductive carbon substrate is at least one selected from the group consisting of a graphite substrate, an acetylene black substrate, and a graphene substrate. In some embodiments, the JAC composition includes about 65-85 wt. % of the JAC, preferably 66-84 wt. %, preferably 67-83 wt. %, preferably 68-82 wt. %, preferably 69-81 wt. %, preferably 70-80 wt. %, preferably 71-79 wt. %, preferably 72-78 wt. %, preferably 73-77 wt. %, and preferably 74-76 wt. % of the JAC having an amorphous structure; about 5-25 wt. % of carbon black, preferably 6-24 wt. %, preferably 7-23 wt. %, preferably 8-22 wt. %, preferably 9-21 wt. %, preferably 10-20 wt. %, preferably 11-19 wt. %, preferably 12-18 wt. %, preferably 13-17 wt. %, preferably 14-16 of carbon black; and about 5-15 wt. % of a polymer binder, preferably 6-14 wt. %, preferably 7-13 wt. %, preferably 8-12 wt. %, and preferably 9-11 wt. % of a polymer binder, each wt. % based on total weight of the JAC composition. In a preferred embodiment, the JAC composition includes about 75 wt. % of the JAC, about 15 wt. % of carbon black, and about 10 wt. % of a polymer binder; each wt. % based on the total weight of the JAC composition.

The polymer binder is at least one selected from the group consisting of a styrene-butadiene rubber, a polyvinylidene fluoride (PVDF), and a polyvinylidene fluoride copolymer. Other suitable examples of fluorinated polymer include polytetrafluoroethylene (PTFE), polyethylene chlorotrifluoroethylene (ECTFE), polyethylene tetrafluoroethylene (ETFE), fluorinated-ethylene-propylene (FEP), perfluoroalkoxy (PFA), polychlorotrifluoroethylene (PCTFE), sulfonated tetrafluoroethylene (Nafion$^R$), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers, and combinations thereof. In a preferred embodiment, the polymer binder is PVDF.

In some embodiments, the JAC are in a form of particles in the shape of, for example in the form of spheres, granules, whiskers, sheets, flakes, flowers, plates, foils, fibers. In a preferred embodiment, the JAC particles are in the form of nanosheets. In an embodiment, the nanosheets of the jute activated carbon have an average thickness of from 7 to 15 nm, preferably 8-14 nm, 9-13 nm, 10-12 nm, or about 11 nm and an average width of 50-200 nm, preferably 75-175 nm, 100-150 nm, or about 125 nm. Other ranges are also possible. In some embodiments, the nanosheets are interconnected which form a porous carbon framework. In other words, the nanosheets are not free standing but each nanosheet is connected and adjacent to at least one other nanosheet. The nanosheets then form a network with pores. In some embodiments, the pores are micropores (less than 2 nm), mesopores (2-50 nm) and/or macropores (greater than 200 nm). In a preferred embodiment, the pores are a combination of micropores, mesopores, and macropores. In some embodiments, the macropores are greater than 200 nm in size, preferably 200-500 nm, 250-450 nm, or about 300-400 nm. In some embodiments, the JAC has an average pore volume of 0.5-1.5 cm$^3$/g, preferably 0.7-1.3 cm$^3$/g, or about 1.0 cm$^3$/g. The surface area of the JAC is greater than 2,000 m$^2$/g, preferably 2050, 2100, 2150, 2200, 2250, 2300, 2350, 2400, 2450, 2500, 2550, 2600, 2650, 2700, 2750, 2800, 2850, 2900, 2950, 3000 m$^2$/g, preferably about 2500-2700 m$^2$/g, preferably 2600 m$^2$/g.

In some embodiments, the conductive carbon substrate is in the form of a sheet having two sides. In some embodiments, only one side of the conductive carbon substrate is covered by the JAC composition. In some embodiments, at least 50% of a total surface area of the conductive carbon substrate is covered by the JAC composition, preferably at least 60%, preferably at least 70%, preferably at least 80%, preferably at least 90%, or even more preferably at least 99% of the total surface area of the conductive carbon substrate is covered by the JAC composition. Other ranges are also possible.

In some embodiments, the ZIHSC further includes an electrolyte containing an aqueous solution of a Zn salt at a concentration of 0.05-5 molars (M), preferably 0.1-4.5 M, preferably 0.5-4.0 M, preferably 1.0-3.5 M, preferably 1.5-3.0 M, and preferably 2.0-2.5 M. In a preferred embodiment, the Zn salt is present in the electrolyte at a concentration of about 2 M. In some embodiments, the Zn salt includes zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate, or mixtures thereof. In a preferred embodiment, the zinc salt is zinc sulfate (ZnSO$_4$). In some embodiments, the aqueous solution also includes water. The water may be tap water, distilled water, bi-distilled water, deionized water, deionized distilled water, reverse osmosis water, and/or some other water, preferably deionized water. In alternate embodiments, the electrolyte may further include one or more of sodium chloride, sodium bicarbonate, potassium bicarbonate, and other non-aqueous electrolytes like N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate, and ethyl propionate.

In some embodiments, the ZIHSC further includes a membrane as a separator. The membrane separates the anode from the cathode. A suitable separator for an electrolyte should have high moisture retention ability and low resistance to electrolyte ion transfer. The separator further assists ionic conduction through the electrolyte, allowing the flow of charged ions during the passage of current. The membrane is a microporous polymeric membrane selected from the group consisting of a polyethylene membrane, a polypropylene membrane, and a polyvinyl chloride (PVC) membrane. In alternate embodiments, the separator may be selected from glass fibers, polyester, Teflon, polytetrafluoroethylene (PTFE), and combinations thereof.

In another embodiment, the electrolyte is a solid-state electrolyte. A solid-state electrolyte (SSE) is a solid ionic conductor and electron-insulating material. In a preferred embodiment, the SSE is a solid polymer electrolyte (SPE) which is a solvent-free salt solution in a polymer host material that conducts ions through the polymer chains. The solid-state electrolyte comprises a base and a polymer. The base is selected from sodium carbonate, sodium bicarbonate, potassium carbonate, potassium bicarbonate, cesium bicarbonate, magnesium bicarbonate, calcium bicarbonate, sodium hydroxide, and potassium hydroxide. In an embodiment, the polymer is selected from polycarbonates, polyesters, polynitriles, polyalcohols, polyamines, polysiloxane, fluoropolymers, lignin, chitosan, and cellulose. In a preferred embodiment, the solid-state electrolyte includes polyvinyl alcohol and potassium hydroxide.

In some embodiments, a plurality of the ZIHSC may be connected in parallel and/or series to form a power bank, which may act as a power source for powering electrical devices. According to the present disclosure, 2-10, preferably 3-9, 4-8, or 5-7 of the ZIHSCs may be connected in parallel and/or series to form the power bank. The number of supercapacitors in the power bank may be determined based on the intended use of the power bank for the specified electrical devices.

In some embodiments, the ZIHSC may be attached to a wearable device and function as a battery to provide electric power to various components of the wearable device. Particularly, the ZIHSC may be electrically connected to a sensor, thereby facilitating the sensor to detect various operating conditions or parameters of the wearable device. In an example, the wearable device may be a wristwatch. In some examples, the wearable device may be any device that may be deriving power from a power source such as a battery; as such, the ZIHSC of the present disclosure may be implemented in the device to function as a battery.

FIG. 1A is a flow chart illustrating a method 70 of making the Zn ED-MS. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes charging the electrolyte containing the Zn salt to an electrochemical cell including a working electrode, a counter electrode, and a reference electrode. The electrolyte may include a sodium salt, and a boric acid in addition to Zn salt. Suitable examples of sodium salts include sodium fluoride, sodium chloride, sodium bromide, sodium iodide, sodium sulfate, and sodium acetate. In a preferred embodiment, the sodium salt is sodium sulfate ($Na_2SO_4$). The concentration of $Na_2SO_4$ is about 0.05-5 M, preferably 0.1-4.5 M, preferably 0.5-4.0 M, preferably 1.0-3.5 M, preferably 1.5-3.0 M, and preferably 2.0-2.5 M. In a preferred embodiment, $Na_2SO_4$ has a concentration of 0.5 M. The concentration of boric acid is about 0.05-5 M, preferably 0.1-4.5 M, preferably 0.5-4.0 M, preferably 1.0-3.5 M, preferably 1.5-3.0 M, and preferably 2.0-2.5 M. In a preferred embodiment, boric acid has a concentration of 0.5 M. Other ranges are also possible.

In some embodiments, the working electrode is a metal substrate. The metal substrate is a steel mesh. The Zn ED-MS is a Zn nanosheets electrodeposited steel substrate (the Zn ED-SS). In some embodiments, the counter electrode may contain an electrically-conductive material such as platinum, platinum-iridium alloy, iridium, titanium, titanium alloy, stainless steel, gold, cobalt alloy, and/or some other electrically-conductive material, where an "electrically-conductive material" as defined here is a substance with an electrical resistivity of at most $10^{-6}$ ohms meter ($\Omega \cdot m$), preferably at most $10^{-7} \Omega \cdot m$, more preferably at most $10^{-8} \Omega \cdot m$ at a temperature of 20-25° C. Other ranges are also possible. The form of the counter electrode may be generally relevant only in that it needs to supply sufficient current to the electrolyte solution to support the current required for the electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode. In a preferred embodiment, the counter electrode is platinum mesh.

In one embodiment, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is Ag/AgCl electrode.

At step 74, the method 70 includes immersing the metal substrate into the electrolyte and applying a potential between the metal substrate and the counter electrode in the electrochemical cell via the electrolyte to form Zn nanosheets deposited on the surface of the metal substrate. The Zn nanosheets may form a continuous layer on the substrate. The particles cover at least 50%, preferably 55%, preferably 60%, preferably 65%, preferably 70%, preferably 75%, preferably 80%, preferably 85%, preferably 90%, and preferably >95% of the substrate, each % based on a total surface area of the Zn nanosheets. In an embodiment, the method further includes applying a potential of 0.2 to 1.8 V, preferably 0.4 to 1.6 V, preferably 0.6 to 1.4 V, preferably 0.8 to 1.2 V, or about 1 V, vs. RHE, to the electrochemical cell. Other ranges are also possible.

At step 76, the method 70 includes removing the metal substrate including the Zn nanosheets from the electrolyte, washing and drying. The washing of the metal substrate may be done using deionized water. The drying can be done by using heating appliances such as hot plates, heating mantles ovens, microwaves, autoclaves, tapes, oil baths, salt baths, sand baths, air baths, hot-tube furnaces, and hot-air guns.

Figure 1B:
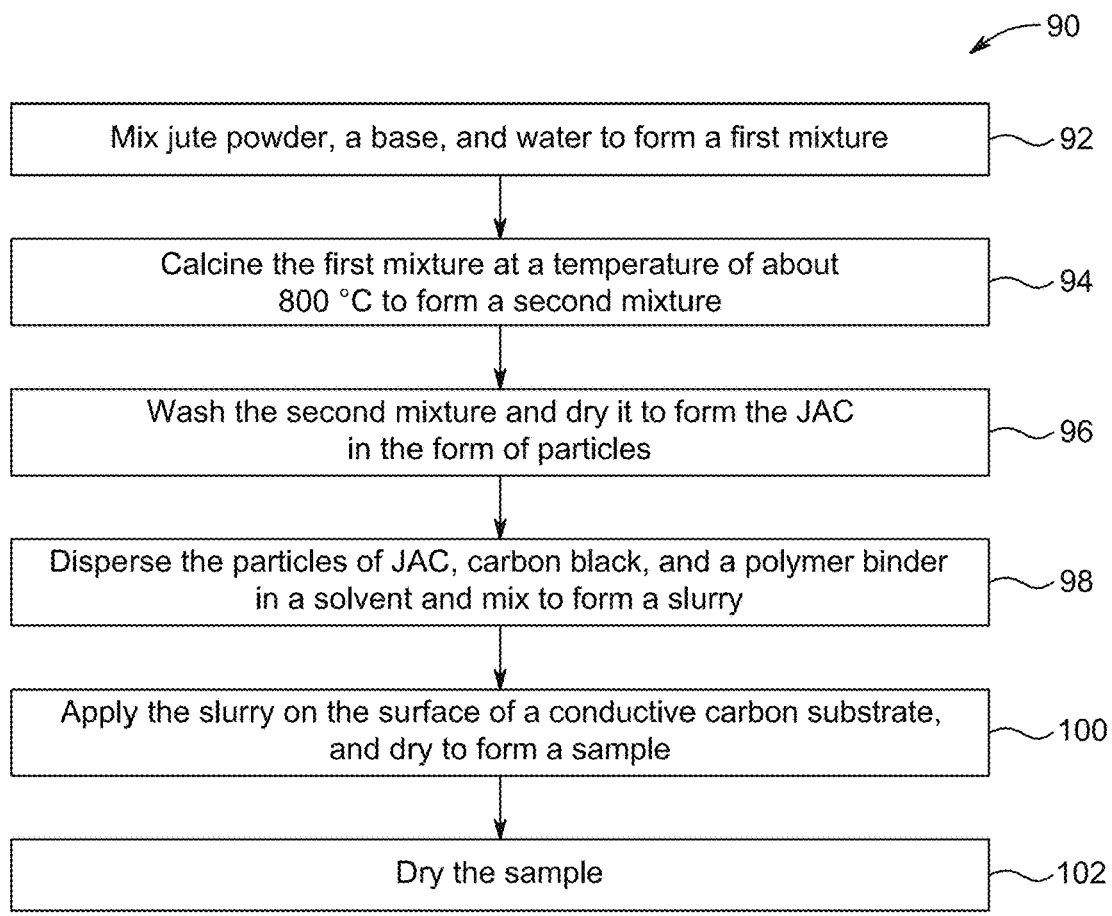
FIG. 1B is a flowchart depicting a method for making a jute-activated carbon-coated conductive carbon substrate (the JAC-CCS), according to certain embodiments.

FIG. 1B is a flow chart illustrating a method 90 of making the JAC-CCS. The order in which the method 90 is described is not intended to be construed as a limitation, and any number of the described method steps can be combined in any order to implement the method 90. Additionally, individual steps may be removed or skipped from the method 90 without departing from the spirit and scope of the present disclosure.

At step 92, the method 90 includes mixing jute powder, a base, and water to form a first mixture. Jute fiber's intrinsic fibrous structure may enhance ionic conductivity, making it a conductive material. In some embodiments, the base may be selected from the group consisting of an alkaline earth metal hydroxide such as beryllium hydroxide ($Be(OH)_2$), magnesium hydroxide ($Mg(OH)_2$), strontium hydroxide ($Sr(OH)_2$), and calcium hydroxide ($Ca(OH)_2$), and/or an alkali metal hydroxide such as lithium hydroxide (LiOH), sodium hydroxide (NaOH), potassium hydroxide (KOH) and rubidium hydroxide (RbOH), and cesium hydroxide (CsOH). In a preferred embodiment, the base is KOH. The water may be tap water, distilled water, bi-distilled water, deionized water, deionized distilled water, reverse osmosis water, and/or some other water. In a preferred embodiment, the water is deionized water. In some embodiments, a weight ratio of jute powder and KOH is from 1:1 to 1:10, preferably 1:2 to 1:8, preferably 1:2-1:6, or even more preferably 1:3-1:5. Other ranges are also possible. In a preferred embodiment, the weight ratio of jute powder and KOH is about 1:4.

In some embodiments, the jute powder may be obtained by milling/grinding jute sticks. In some further embodiments, the jute sticks may be obtained by collecting or otherwise obtained and cut/chopped into small pieces, and optionally rinsed/cleaned with water. Generally, at least 50, 60, 70, 75, 80, 85, 90, 91, 92, 92.5, 93, 94, 95, 96, 97, 97.5, 98, 99, 99.1, 99.5, or 99.9 wt. % of jute sticks may be the stalks of jute or typically the less fibrous material left behind after removal (or substantial removal) of the jute fibers, ribbons, and the like, generally post-retting.

In an embodiment, the jute sticks are cut/chopped/ground/chipped to a size of about 1 to 5 cm, preferably 2 to 4 cm, preferably 2 to 3 cm, washed, and subsequently dried in an oven at 90 to 140° C., preferably 95 to 130° C., preferably 100 to 120° C., preferably about 100 to 110° C., preferably 100° C. to reduce the moisture content to below 5 wt. %, preferably below 4 wt. %, preferably below 3 wt. %, preferably below 2 wt. %, preferably below 1 wt. %. The cut *Corchoris olitorius* sticks may be dried for any amount of time that provides an adequately dried product, typically, for drying times of 12 to 48 hours, preferably 24 hours. The dried jute sticks are further pulverized to produce the jute powder using any suitable means, for example, by grinding, ball milling, blending, etc., using manual methods (e.g., mortar) or machine-assisted methods such as using a mechanical blender, or any other apparatus known to those of ordinary skill in the art. The dried jute sticks are preferably pulverized until an average particle size of less than 400 µm, preferably less than 200 µm, preferably less than 100 µm, or even more preferably less than 50 µm, is achieved to form the jute powder. Other ranges are also possible.

The dried jute sticks in the form of powder may be further pyrolyzed by placing the powder into a furnace such as a tubular furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min, preferably 5° C./min. In preferred embodiments, the jute sticks are heated with a heating rate in the range of 1 to 15° C./min, preferably 3 to 10° C./min, preferably 5 to 10° C./min to 300-500° C., for 1 to 15 hours, preferably 2 to 10 hours, preferably 3 to 8 hours, preferably 3 hours. The furnace may also be equipped with a cooling accessory such as a cooling air stream system, or a liquid nitrogen stream system, which may provide a cooling rate of up to 20° C./min, or preferably up to 15° C./min, or preferably up to 10° C./min, preferably 5° C./min, preferably until the temperature was below 50° C. Other ranges are also possible. Pyrolysis of the pulverized jute sticks preferably forms a solid, for example, a carbonaceous ash/char/tar that mainly contains partially carbonized jute powder.

The pyrolyzed jute sticks may be treated with the acid solution, HCl (although other acids such as sulfuric acid or nitric acid may be used as well) using any known agitation method known to those of ordinary skill in the art, for example, via stirring, swirling, mixing, sonicating (e.g., ultrasonication or sonication). The treated jute sticks may be washed with water and further dried at 50 to 90° C., preferably 55 to 85° C., preferably 60 to 80° C., for 6 to 15 hours, preferably 12 hours to form the jute activated carbon. It is preferred that the drying is carried out under a vacuum to prevent air oxidation.

In some embodiments, the jute powder used in step 92 of the method 90 includes at least one of unpyrolyzed jute powder, partially carbonized jute powder, and acid treated pyrolyzed jute powder.

At step 94, the method 90 includes calcinating the first mixture at a temperature of from 600 to 1000° C., or even more preferably about 800° C. to form a second mixture. The calcination is carried out by heating it to a high temperature, under a restricted supply of ambient oxygen. This is performed to remove impurities or volatile substances and to incur thermal decomposition. In some other embodiments, the calcinating is performed in an inert gas (e.g., nitrogen, helium, neon, and/or argon), preferably nitrogen. Typically, the calcination is carried out in a furnace preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min. Other ranges are also possible. In some embodiments, the calcination of the first mixture may be done at a temperature of about 700-900° C., preferably 710-890° C., preferably 720-880° C., preferably 730-870° C., preferably 740-860° C., preferably 750-850° C., preferably 760-840° C., preferably 770-830° C., preferably 780-820° C., and preferably 790-810° C. Other ranges are also possible. In a preferred embodiment, the calcination of the first mixture may be done at a temperature of 800° C. Other ranges are also possible.

At step 96, the method 90 includes washing the second mixture and drying to form the JAC in the form of particles. In some embodiments, the washing may be done by using a solvent like water, alcohol, acid, or a mixture thereof. Suitable solvents of alcoholic solvents include methanol, ethanol, and iso-propanol. The water may be tap water, distilled water, bi-distilled water, deionized water, deionized distilled water, reverse osmosis water, and/or some other water. Suitable acidic solvents for washing include hydrochloric acid (HCl), sulphuric acid ($H_2SO_4$), and nitric acid ($HNO_3$). In a preferred embodiment, the washing is done by using HCl solution. The concentration of HCl is about 0.05-5 M, preferably 0.1-4.5 M, preferably 0.5-4.0 M, preferably 1.0-3.5 M, preferably 1.5-3.0 M, and preferably 2.0-2.5 M. In a preferred embodiment, HCl has a concentration of 0.5 M. Other ranges are also possible.

The mixing may be carried out manually or with the help of a stirrer. In some embodiments, the solvent is an organic or an inorganic solvent. Suitable examples of the organic solvent may be a ketone solvent, an ester solvent, an alcohol solvent, an amide solvent, and an ether solvent. Suitable examples of ketone solvents include acetone, acetophenone, and/or combinations thereof. Suitable examples of ester solvents include ethyl acetate, methyl salicylate, and/or combinations thereof. Suitable examples of alcohol solvents include ethanol, isopropyl alcohol, and/or combinations thereof. Suitable examples of amide solvents include dimethylformamide (DMF), acetamide, and/or combinations thereof. Suitable examples of ether solvents include diethyl ether and Tetrahydrofuran (THF). In a preferred embodiment, the solvent is a mixture of organic and inorganic solvent, preferably a mixture of methanol and water. The ratio of methanol to water in the solvent is in the range of 1:1 to 10:1, preferably 1:1, 2:1, 3:1, 4:1, or 5:1.

At step 98, the method 90 includes dispersing the particles of the JAC, carbon black, and a polymer binder in a solvent and mixing to form a slurry. In a preferred embodiment, the polymer binder is PVDF. In a preferred embodiment, the conductive carbon substrate is a graphite substrate (GrF). In a preferred embodiment, the JAC-CCS is a jute activated carbon coated conductive carbon substrate (JAC-GrF).

At step 100, the method 90 includes applying the slurry on the surface of a conductive carbon substrate and drying it to form a sample. The slurry was then coated onto, e.g., preferably a 16 mm diameter graphite foil substrate/any other conductive carbon substrate and subjected to, e.g., preferably a 12 h period at a temperature of, e.g., preferably about 80° C. in an electric oven. Other ranges are also possible. In some embodiments, the applying can be done by any method in the art, including but not limited to drop casting, spin coating, and using an automatic coating machine.

At step 102, the method 90 includes drying the sample. The drying can be done by using heating appliances such as hot plates, heating mantles ovens, microwaves, autoclaves, tapes, oil baths, salt baths, sand baths, air baths, hot-tube furnaces, and hot-air guns. In some embodiments, the drying of the sample is done from 75-85° C., preferably 76-84° C., preferably 77-83° C., preferably 78-82° C., and preferably 79-8° C. In a preferred embodiment, the drying of the sample is done at 80° C. in an electric oven.

In some embodiments, the ZIHSC has an energy density of about 90-130 watt-hours per kilogram (Wh/kg), preferably 98-118 Wh/kg, preferably 99-117 Wh/kg, preferably 100-116 Wh/kg, preferably 101-115 Wh/kg, preferably 102-114 Wh/kg, preferably 103-113 Wh/kg, preferably 104-112 Wh/kg, preferably 105-111 Wh/kg, preferably 106-110 Wh/kg, or even more preferably 107-109 Wh/kg, at a current density of about 0.1 amperes per gram (A/g). Other ranges are also possible.

In some embodiments, the ZIHSC has a power density of 70-90 watts per kilogram (W/kg), preferably 71-89 W/kg, preferably 72-88 W/kg, preferably 73-87 W/kg, preferably 74-86 W/kg, preferably 75-85 W/kg, preferably 76-84 W/kg, preferably 77-83 W/kg, preferably 78-82 W/kg, and preferably 79-81 W/kg, at a current density of about 0.1 A/g. Other ranges are also possible.

In some embodiments, the ZIHSC has a specific capacitance of about 280-325 farads per gram (F/g), preferably 285-320 F/g, preferably 290-315 F/g, preferably 295-310 F/g, and preferably 300-305 F/g, at a current density of about 0.1 A/g. Other ranges are also possible.

In a preferred embodiment, the ZIHSC supercapacitor has an energy density of 108.4 Wh/kg, a power density of 80 W/kg, and a specific capacitance of about 305 F/g, each measured at a current density of about 0.1 A/g.

EXAMPLES

The following examples demonstrate the zinc (Zn) ion hybrid supercapacitor (ZIHSC) in the form of an electrochemical cell. The examples are provided solely for illustration and are not to be construed as limitations of the present disclosure, as many variations thereof are possible without departing from the spirit and scope of the present disclosure.

Example 1: Materials

Zinc sulfate ($ZnSO_4 \cdot 7H_2O$, Loba Chemie), Sodium sulfate ($Na_2SO$, Sigma-Aldrich), boric acid ($H_3BO_3$, Emsure), 100 μm stainless steel mesh, jute sticks obtained from dried jute plants, Potassium hydroxide (KOH, Research Lab), Carbon black from MTI CORP, Whatman filter papers, polyvinylidene fluoride (PVDF, HSV900, Sigma-Aldrich), and 1-methyl-2-pyrrolidone (NMP, Sigma-Aldrich), High purity nitrogen gas ($N_2$, AL KIG Dammam purity 99,999) were used.

Example 2: Instrumentation

The phase structure of the Zn ED-SS electrode and the JAC-GrF were examined using X-ray diffraction (XRD), utilizing Cu—$K_\alpha$ radiation (wavelength=0.15416 nm). The electrode morphology was studied using energy-dispersive X-ray spectroscopy (EDS), and a high-resolution field-emission scanning electron microscope (FESEM, LYRA3 TESCAN) was performed. The oxidation states of the electrodes were determined using a monochromatic Al—K-alpha X-ray source for X-ray photoelectron spectroscopy (XPS) (Thermo-Scientific, ESCALAB-250Xi XPS-Microprobe). The electrodes were cut using a disc-cutting machine (MTI-MSK-T10) and compacted using an electric crimper (MSK-160E) for assembling the coin cell. A computer-controlled electrochemical workstation was used to perform the electrochemical measurements (CH Instrument 760E), and the stability test was performed using a Landt battery test system (CT3002A). Surface morphology was investigated using field emission electron microscopy (FETEM: JEOL JEM-2100F).

Example 3: Electrodeposition of Zn on Steel Mesh

Figure 2A:
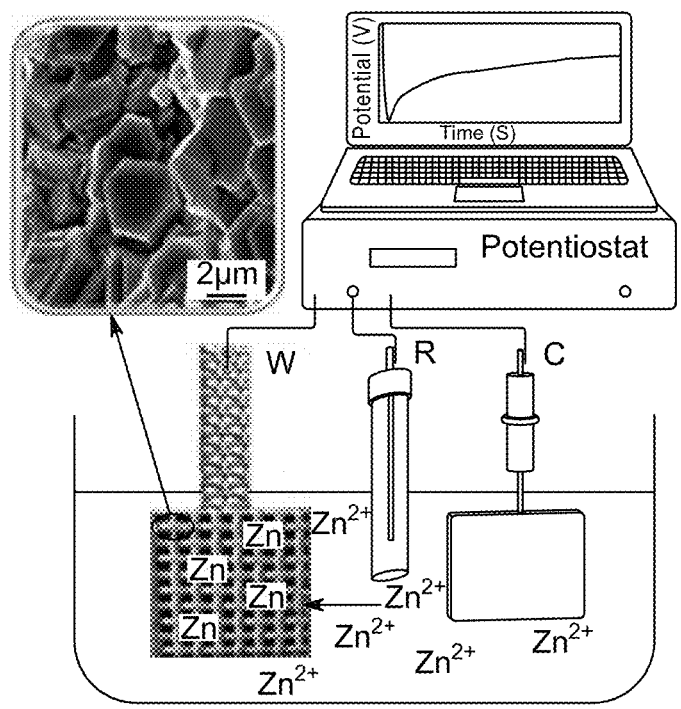
FIG. 2A shows a three-electrode system showing the electrodeposition of Zn on a steel mesh, according to certain embodiments.

A solution consisting of 0.6 molar (M) zinc sulfate ($ZnSO_4$) source of zinc ions, 0.5 M sodium sulfate ($Na_2SO_4$) acts as a supporting electrolyte to enhance the conductivity of the bath, and 0.5 M boric acid ($H_3BO_3$) serves as a pH buffer were used to electrodeposit zinc films. In the three-electrode experiments, a counter electrode made of platinum mesh and a reference electrode of Ag/AgCl were employed, and a current collector made of stainless-steel mesh area of 4 $cm^2$ was employed as a working electrode (FIG. 2A). Current voltammetry (CV), i-t amperometry, and chronopotentiometry techniques to get the ideal Zn anode deposition. Following the deposition process using each method, it was observed that a favorable morphology and a uniform film were achieved through chronopotentiometry, where a constant current was applied; unlike CV and i-t amperometry, which led to non-uniform deposition.

Example 4: Preparation of the JAC

Figure 2B:
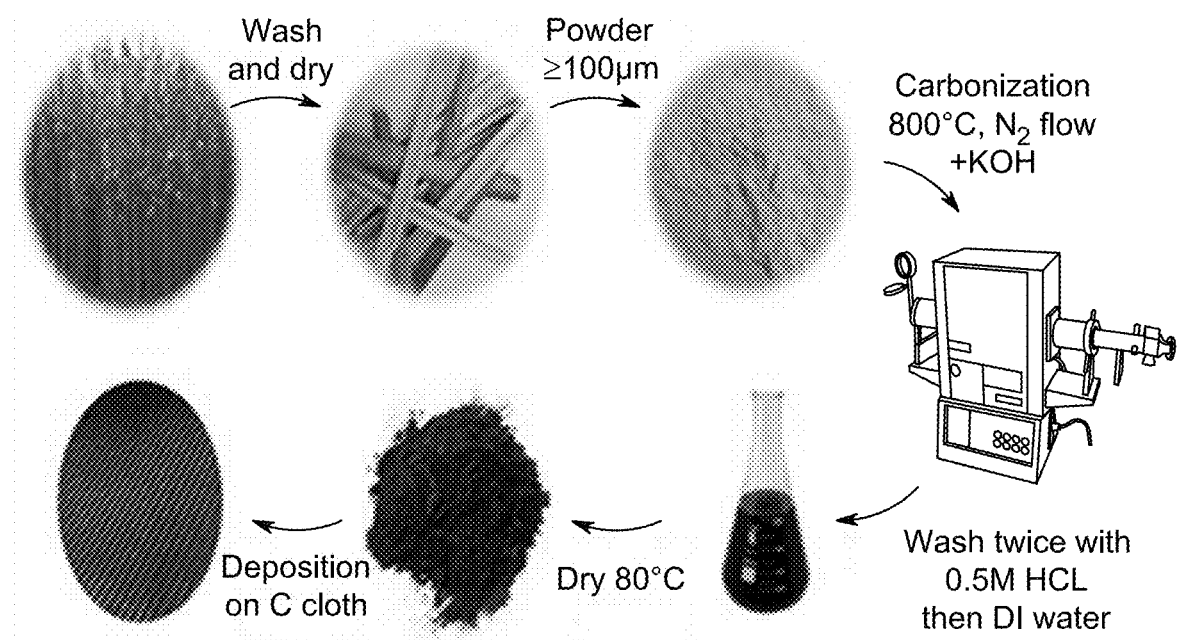
FIG. 2B shows a process of preparing porous activated carbon from jute sticks, according to certain embodiments.

FIG. 2B shows a modified process of preparing porous activated carbon from jute sticks (See: S. S. Shah, M. A. Aziz, E. Cevik, M. Ali, S. T. Gunday, A. Bozkurt, Z. H. Yamani, *Sulfur nano-confinement in hierarchically porous jute derived activated carbon towards high-performance supercapacitor: Experimental and theoretical insights*, Journal of Energy Storage 56 (2022) 105944, which is incorporated herein by reference in its entirety). The jute powder and potassium hydroxide (KOH) were mixed at a weight ratio of, e.g., preferably about 1:4 with 40 mL DI water and kept drying overnight, and the activation process was conducted at a temperature of, e.g., preferably 800° C. for, e.g., preferably 5 hours (h) under Nitrogen atmosphere. Afterward, the carbon was subjected to two rounds of washing, first with, e.g., preferably a 0.5 M HCl solution and then with deionized (DI) water until a neutral pH was achieved. Following the water filtration step, the JAC was subsequently dried at e.g., preferably about 80° C. for a duration of about 3 h. Other ranges are also possible.

The utilization of the high surface area of the JAC in energy storage applications holds enhanced potential, which emerges as a choice for various energy storage devices, encompassing supercapacitors and batteries, due to its characters such as high porosity, a large specific surface area, superior conductivity, and cost-effectiveness. The high surface area of the JAC allows for increased electrode-electrolyte contact, facilitating efficient ion diffusion and storage. This results in improved electrochemical performance, including enhanced specific capacitance and energy density in supercapacitors, and higher capacity and cycling stability in batteries. Moreover, the JAC is derived from a renewable and abundant natural resource, making it environmentally friendly and sustainable. Its cost-effectiveness compared to other carbon-based materials further adds to its attractiveness for large-scale energy storage applications.

Example 5: Coin Cell Assembling

To fabricate the cathode (the JAC-GrF), a mixture containing 75 wt. % the JAC, 15 wt. % carbon black, and 10 wt.

Figure 2C:
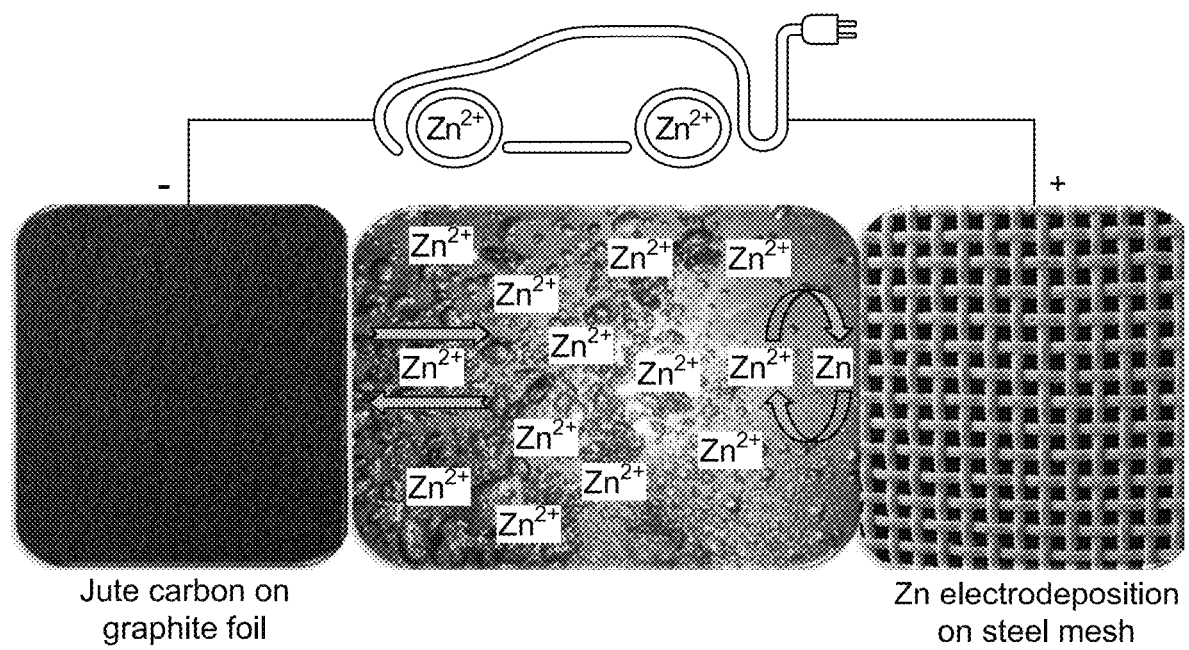
FIG. 2C shows a schematic diagram of the device structure and working mechanism of the Zn ion hybrid supercapacitor (ZIHSC), according to certain embodiments.

% PVDF was dispersed in NMP solvent and blended in a gate mortar to obtain a homogeneous slurry. This slurry was then coated onto a 16 mm diameter graphite foil substrate and subjected to a 12 h period at a temperature of 80° C. in an electric oven. The ZIHSC cell was constructed using the JAC-GrF as the positive electrode (i.e., cathode) and Zn electrodeposition on a stainless-steel mesh as the negative electrode (i.e., anode). FIG. 2C shows a schematic diagram of the device structure and working mechanism of the ZIHSC. A separator with a diameter of, e.g., preferably about 19 millimeters (mm), soaked in a 2 M $ZnSO_4$ electrolyte, was inserted between the electrodes. CP2032 coin-type cells were used to conduct electrochemical performance tests at room temperature. The hybrid supercapacitor assembled in the present disclosure is herein referred to as the Zn ED-SS//the JAC-GrF.

Example 6: Electrochemical Measurements

The performance of the ZIHSCs was characterized using various techniques in an aqueous solution of 2 M $ZnSO_4$ as an electrolyte. CV was conducted by sweeping the voltage range, e.g., preferably from 0.2 to 1.8 V, utilizing scan rates that varied, e.g., preferably from 10 to a maximum of 200 mV $s^{-1}$. Galvanostatic charge-discharge (GCD) tests were performed at different current densities within the voltage range of, e.g., preferably from 0.2 to 1.8 V. Electrochemical impedance spectroscopy (EIS) measurements were taken across a frequency range, e.g., preferably from 0.01 Hz to 100 kHz, with a potential amplitude of, e.g., preferably about 10 mV.

A CT3002A Landt Battery Test System was employed to determine the long-term cycling stability. The tests may be carried out within the voltage range of, e.g., preferably from 0.2 to 1.8 V. The specific capacitance (C, $Fg^{-1}$), energy density (E, Wh $kg^{-1}$), and power density (P, W $kg^{-1}$) of the ZIHSCs were determined from GCD measurements using the relevant equations as below:

$$\text{Specific capacitance }(C) = \frac{(\text{discharge current} \times \text{discharge time})}{(\text{mass of active materials} \times \text{working voltage})} \quad (1)$$

$$\text{Energy density }(E) = \frac{0.5 \times C \times (\text{working voltage})^2}{3.6} \quad (2)$$

$$\text{Power density }(P) = \frac{E * 3600}{\text{discharge time}} \quad (3)$$

Example 7: Results

Figure 3A:
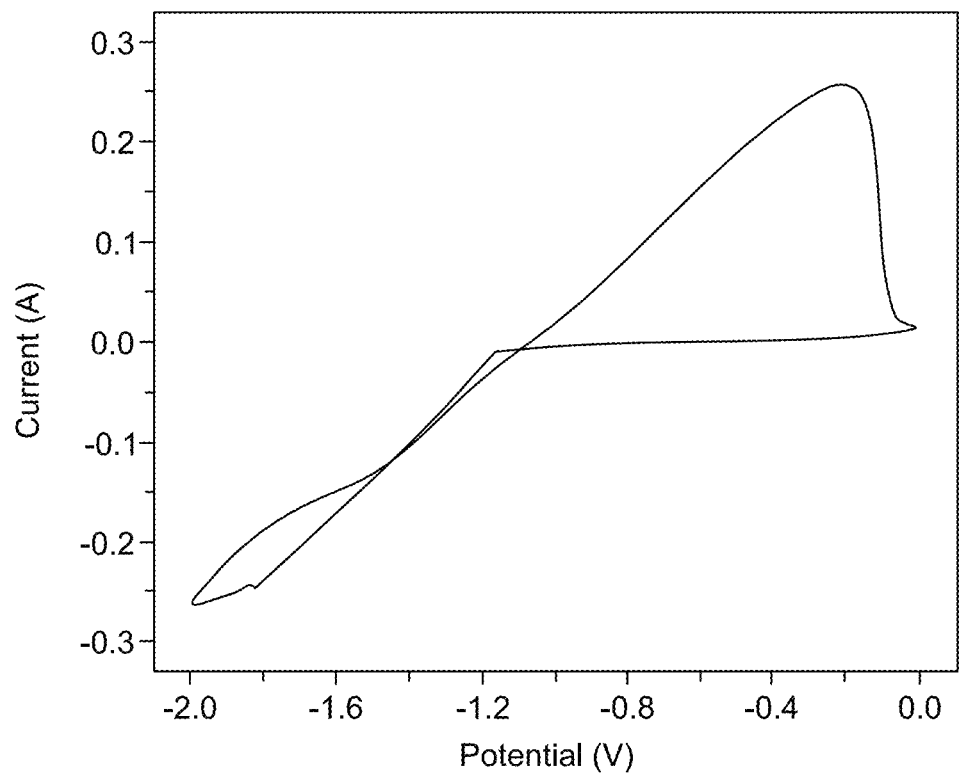
FIG. 3A shows an electrodeposition curve resulting from cyclic voltammetry (CV), according to certain embodiments.
Figure 3B:
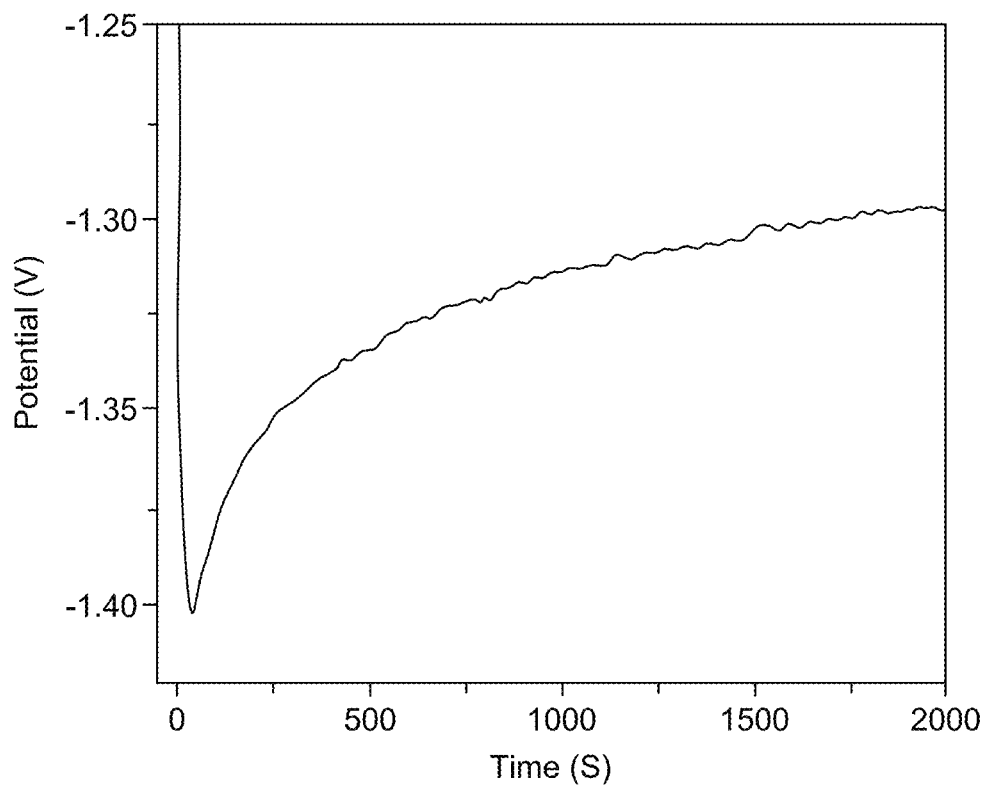
FIG. 3B shows the Zn electrodeposition achieved using chronopotentiometry, with a galvanostatic current of 0.025 A/cm$^2$, according to certain embodiments.
Figure 3C:
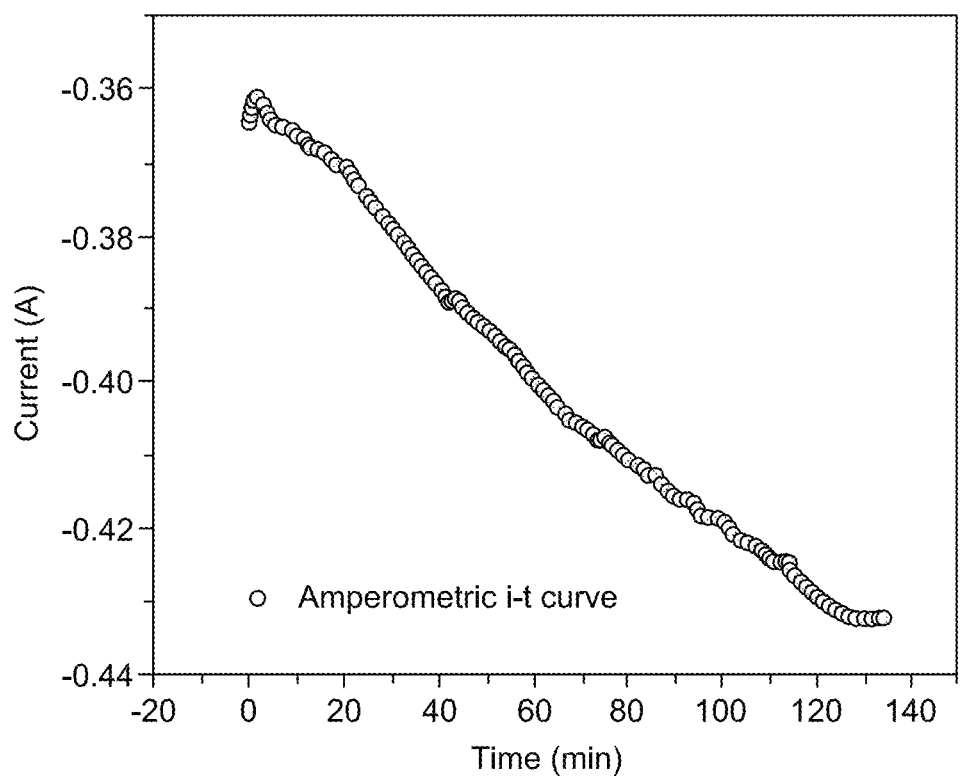
FIG. 3C shows a deposition curve obtained through i-t amperometry, according to certain embodiments.
Figure 3D:
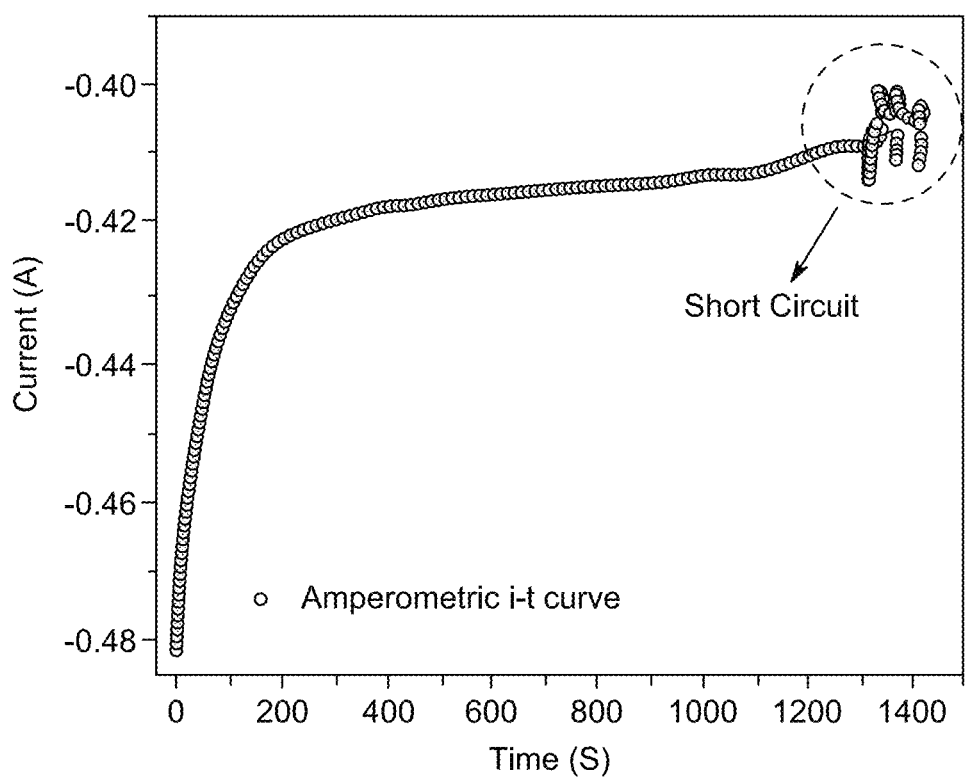
FIG. 3D shows the amperometric i-t curve for Zn electrodeposition at a high potential, highlighting the occurrence of a short circuit due to dendrite formation, according to certain embodiments.
Figure 3E:
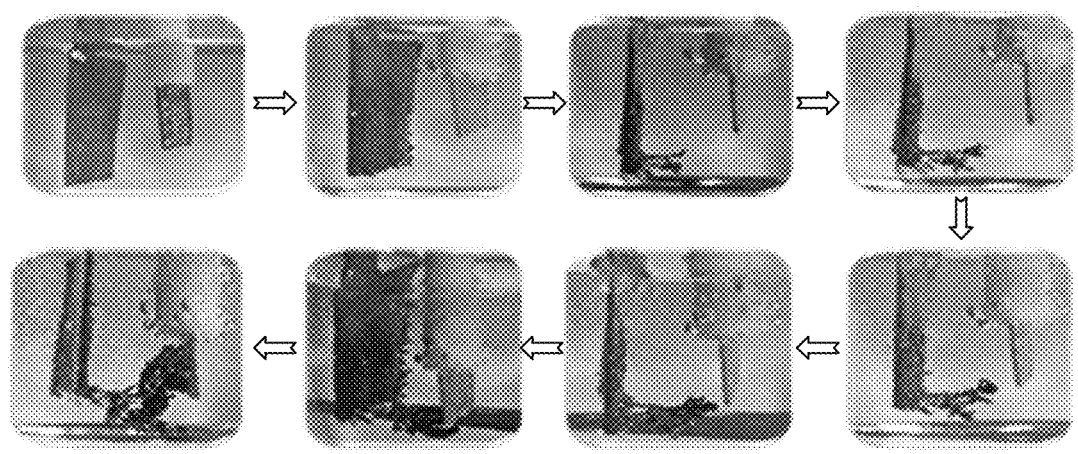
FIG. 3E shows photographs of dendrites formed at −3 V with different applied times, according to certain embodiments.

The performance of ZIHSCs may be influenced by the characteristics of the Zn anode, which include factors such as its uniformity, crystalline structure, and nano structural features on the surface. Electrodeposition is a well-established technique for depositing various metals onto substrates while precisely controlling their morphology and electroactive surface area. However, the quality of the deposited Zn film may be dependent on the composition of the electroplating, as well as the electrodeposition method employed. A Zn film may be obtained on a steel mesh from an aqueous solution of ZnSO4. Initially cyclic voltammetry was utilized, where the potential was cycled, e.g., preferably from 0 to −2 V (FIG. 3A) at various scan rates. Samples prepared by the cyclic voltammetry technique using different scan rates may result in the formation of non-homogeneous films. In the second test, chronopotentiometry was turned to the deposition technique (FIG. 3B), varying the applied current densities. The chronopotentiometry technique may yield a uniform deposition. Notably, using chronopotentiometry at a current density of 0.025 A $cm^{-2}$ for a duration of 30 minutes (min) may produce an improved homogeneous and intriguing morphology. For the third test, i-t amperometry while adjusting the applied potential was conducted. A homogeneous deposition was achieved when using −1.5 V (as depicted in FIG. 3C). When a higher potential (−3 V) was employed during the i-t amperometry method, the formation of dendrites was observed with the times, as depicted in FIG. 3D. These needle-like dendritic structures formed on the electrode surface due to the inhomogeneous deposition of zinc (as depicted in FIG. 3E). The dendrites may penetrate the separator inside the cell. This penetration may lead to a short circuit within the cell, which can impact the performance and safety of the electrochemical device.

Figure 4A:
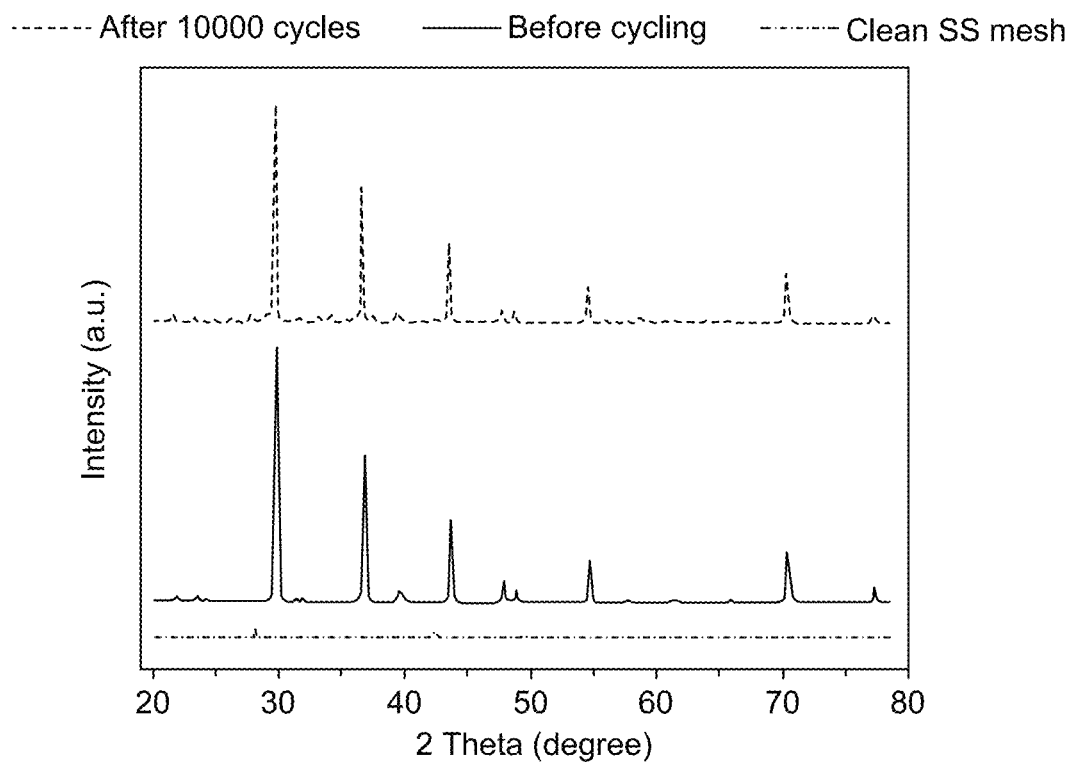
FIG. 4A shows X-ray diffraction (XRD) patterns for clean stainless steel (SS) mesh and Zn nanosheets electrodeposited steel substrate (the Zn ED-SS) before and after cycling, according to certain embodiments.
Figure 4B:
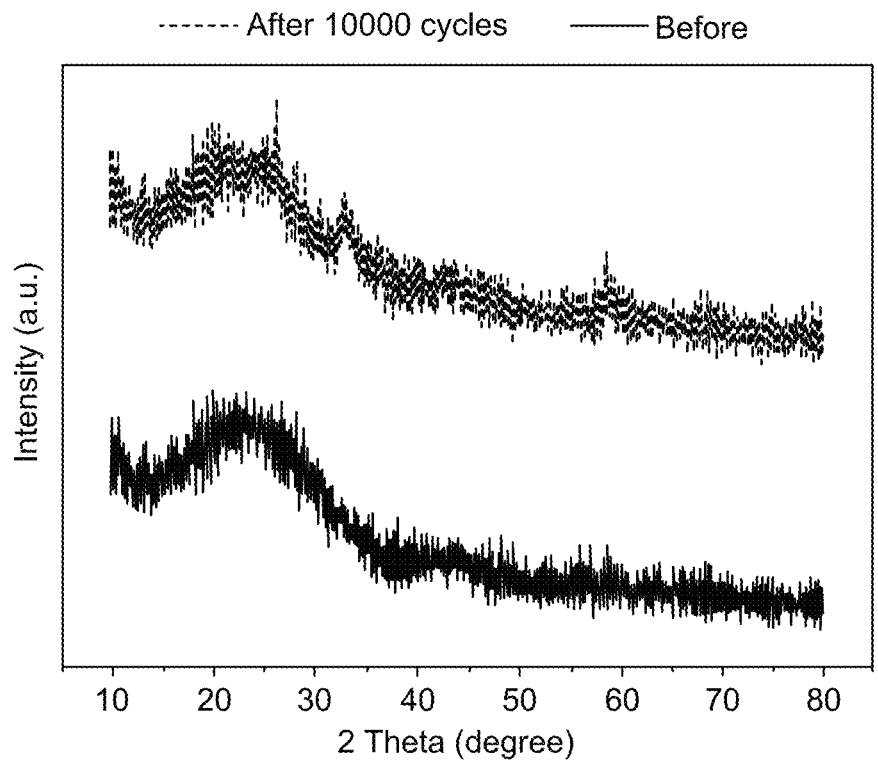
FIG. 4B shows XRD patterns for jute activated carbon (the JAC) before and after cycling, according to certain embodiments.
Figure 5A:
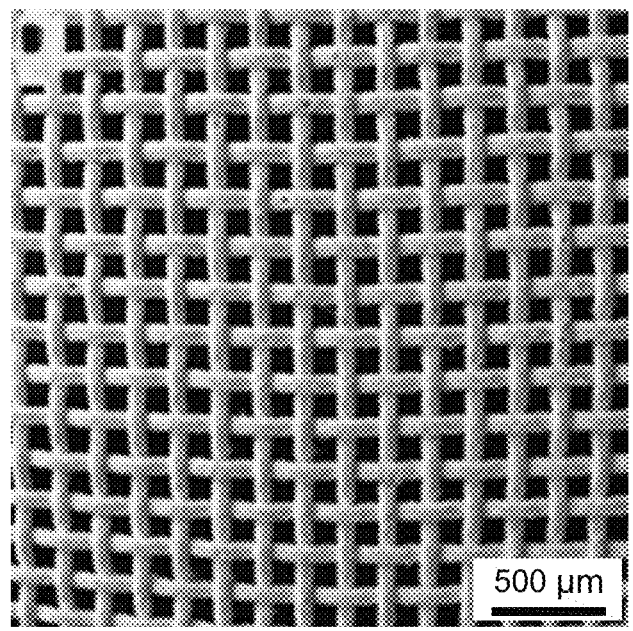
FIG. 5A is a Field-emission scanning electron microscopic (FESEM) image of the Zn ED-SS at 500 μm magnification, according to certain embodiments.
Figure 5B:
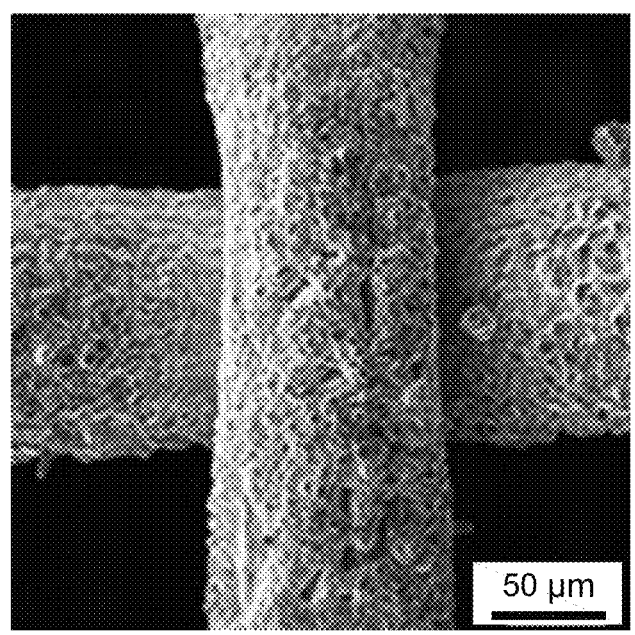
FIG. 5B is a FESEM image of the Zn ED-SS at 50 μm magnification, according to certain embodiments.
Figure 5C:
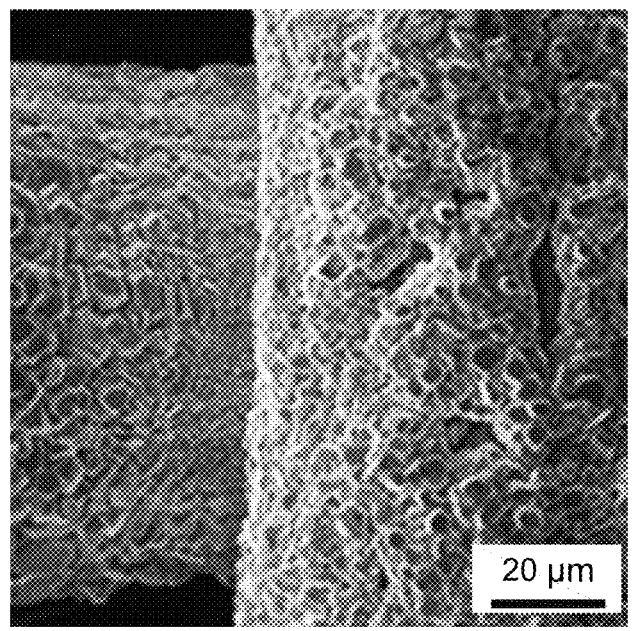
FIG. 5C is a FESEM image of the Zn ED-SS at 20 μm magnification, according to certain embodiments.
Figure 5D:
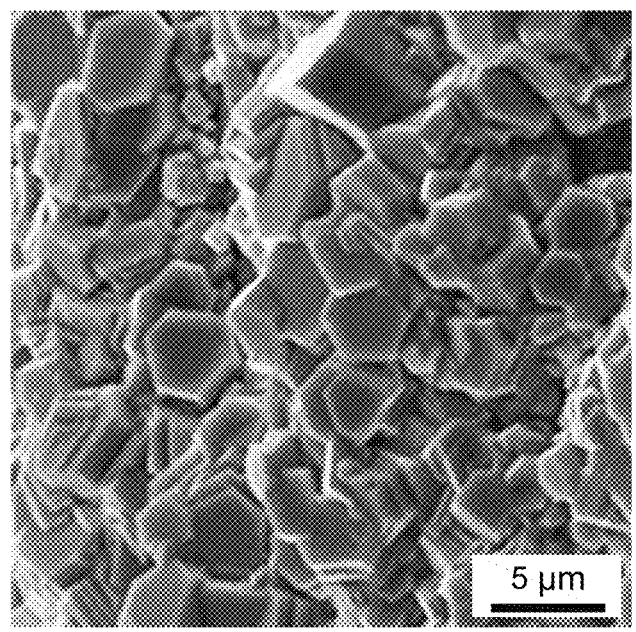
FIG. 5D is a FESEM image of the Zn ED-SS at 5 μm magnification, according to certain embodiments.
Figure 5E:
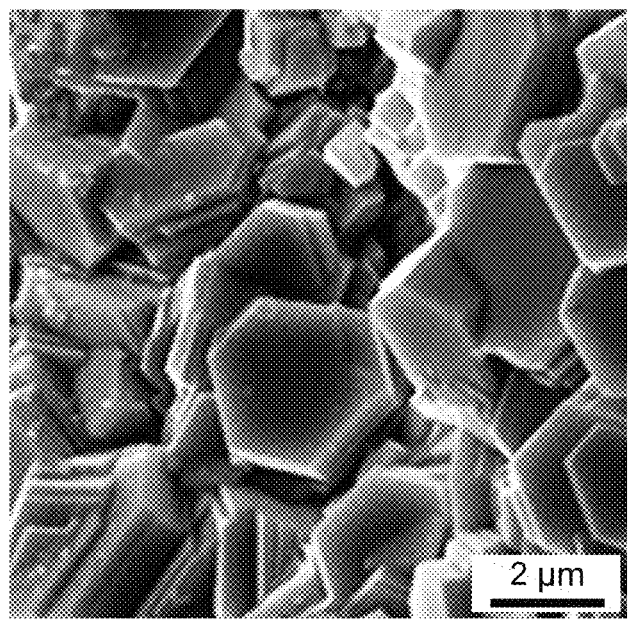
FIG. 5E is a FESEM image of the Zn ED-SS at 2 µm magnification, according to certain embodiments.
Figure 5F:
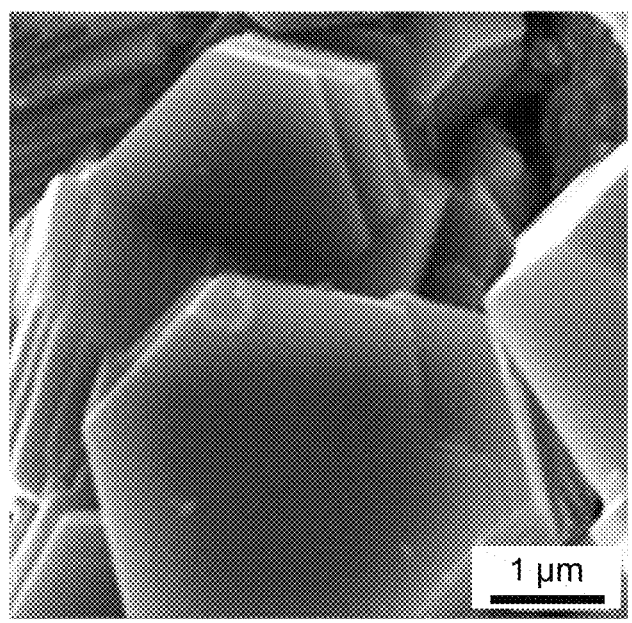
FIG. 5F is a FESEM image of the Zn ED-SS at 1 µm magnification, according to certain embodiments.
Figure 5G:
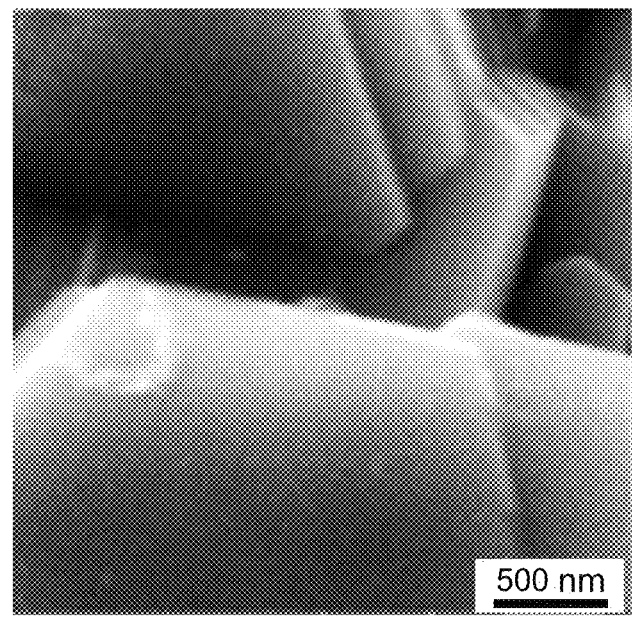
FIG. 5G is a FESEM image of the Zn ED-SS at 500 nm magnification, according to certain embodiments.
Figure 5H:
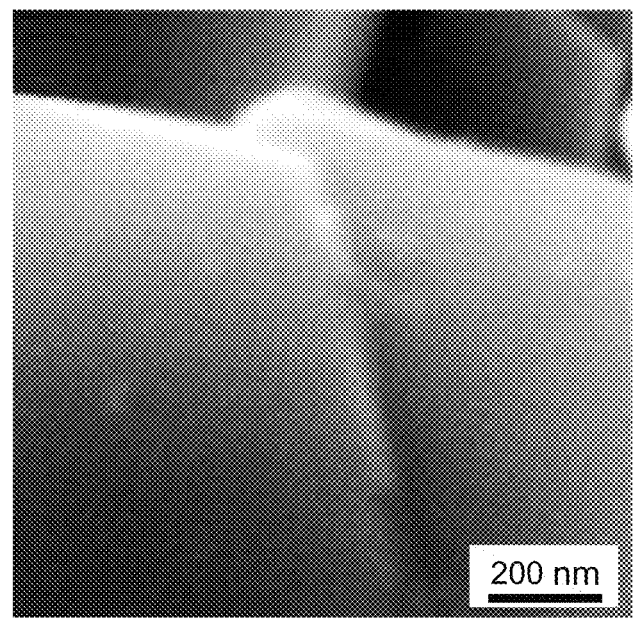
FIG. 5H is a FESEM image of the Zn ED-SS at 200 nm magnification, according to certain embodiments.

As the chronopotentiometry at a current density of, preferably about 0.025 A $cm^2$ for 30 min produced a homogeneous morphology, this has been applied as the anode in the ZIHSC fabrication. The electrodeposited sample prepared by this method and condition is denoted as the Zn ED-SS in the present disclosure. The crystallographic structure was examined using the XRD technique. The XRD patterns in FIG. 4A shows that the Zn ED-SS electrode exhibits one or more peaks at 36.1°, 38.8°, 43.0°, 54.1°, and 70.0°. The observed characteristics can be attributed to the crystal planes of Zn, specifically the (002), (100), (101), (102), and (103) planes. After approximately 10,000 cycles, the changes observed are substantially related to the intensity of the diffraction peaks, and no additional phases or byproducts are detected on the Zn ED-SS electrode. This indicates its improved reversibility. The X-ray Diffraction (XRD) analysis of the JAC indicated its amorphous nature with two peaks at 25.3 and 43.2 corresponding to two crystallographic planes (002) and (100), with no significant alterations (FIG. 4B) observed in the XRD spectrum even after 10,000 cycles charging and discharging of the fabricated the Zn ED-SS// the JAC-GrF) hybrid supercapacitor.

FESEM was employed to analyze the morphology and microstructure of the Zn ED-SS. FIGS. 5A-5H displays FESEM micrographs at various magnifications, showing the presence of uniformly shaped nanosheets on the stainless-steel mesh, the electrochemical performance can be enhanced by the outspread nanosheet film, which can increase the area of the interface between the electrode material and electrolyte and provide many electroactive sites for redox processes. FESEM analysis of the JAC revealed a nanosheet-like morphology characterized by a highly porous surface with well-developed pores (See: M. A. Aziz, I. R. Chowdhury, M. A. J. Mazumder, S. Chowdhury, *Highly porous carboxylated activated carbon from jute stick for removal of $Pb^{2+}$ from aqueous solution, Environmental Science and Pollution Research* 26 (2019) 22656-2266, which is incorporated herein by reference in its entirety). The surface exhibited a diverse range of pores, indicating the presence of macropores interconnected with micropores and mesopores. This porous structure observed in the JAC was a direct outcome of the activation process employing KOH as the activating agent.

Figure 6A:
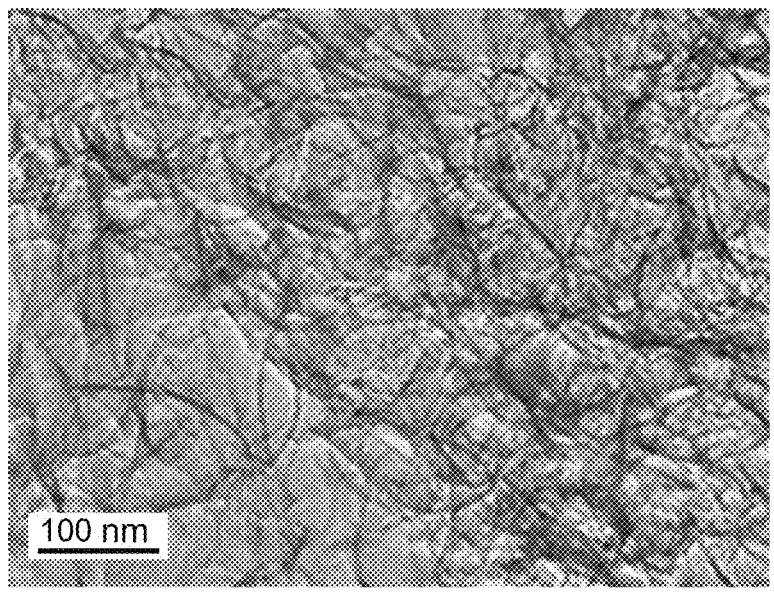
FIG. 6A-6C shows transmission electron microscopic (TEM) images of the JAC at different magnifications, according to certain embodiments.
Figure 6B:
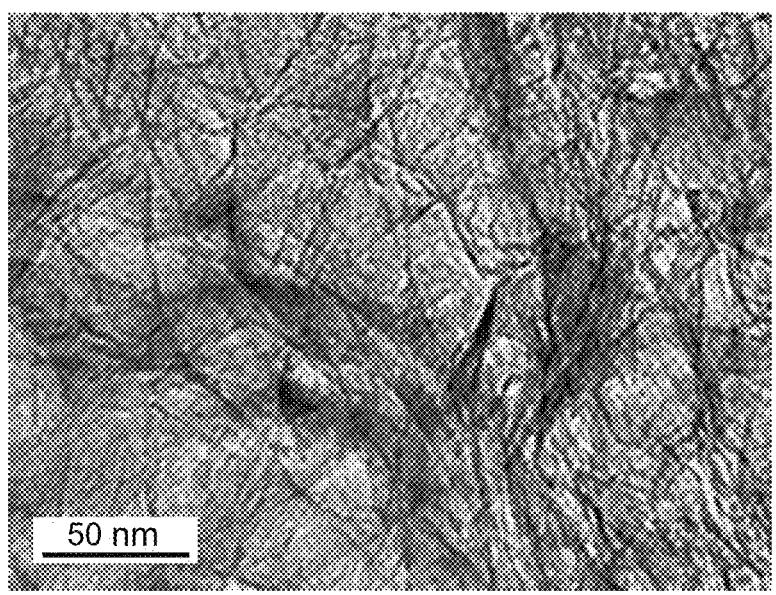
Figure 6C:
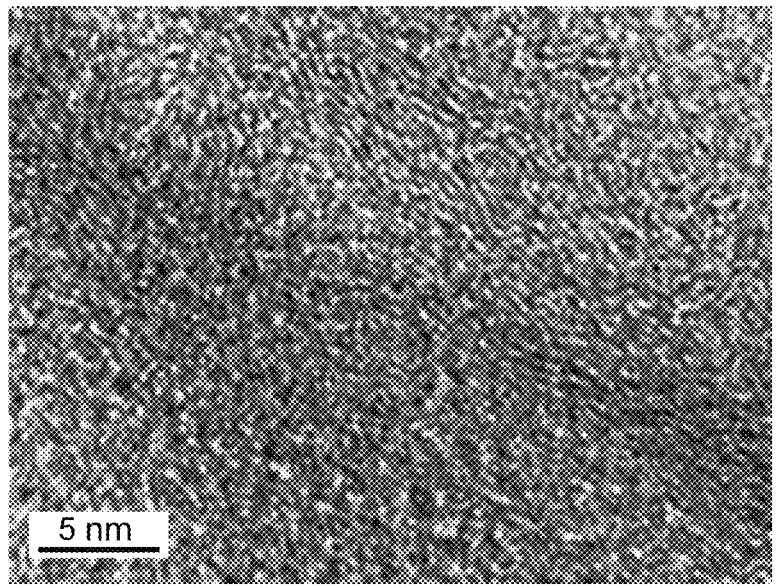
Figure 6D:
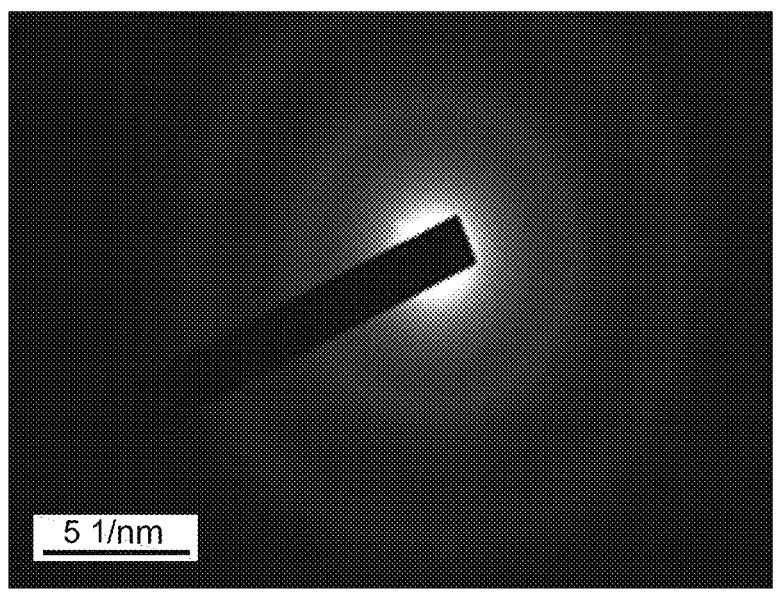
FIG. 6D shows a selected area electron diffraction (SAED) pattern of the JAC, according to certain embodiments.
Figure 6E:
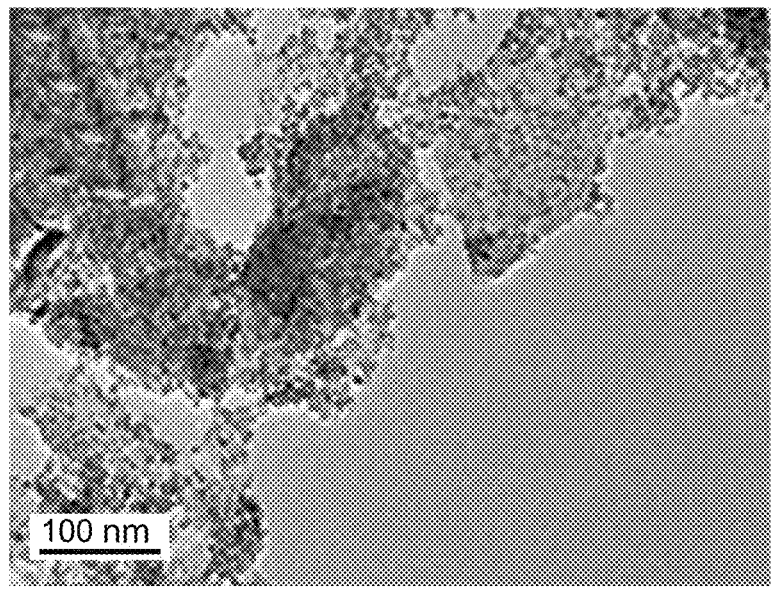
FIG. 6E-6F shows TEM images of the Zn ED-SS at different magnifications, according to certain embodiments.
Figure 6F:
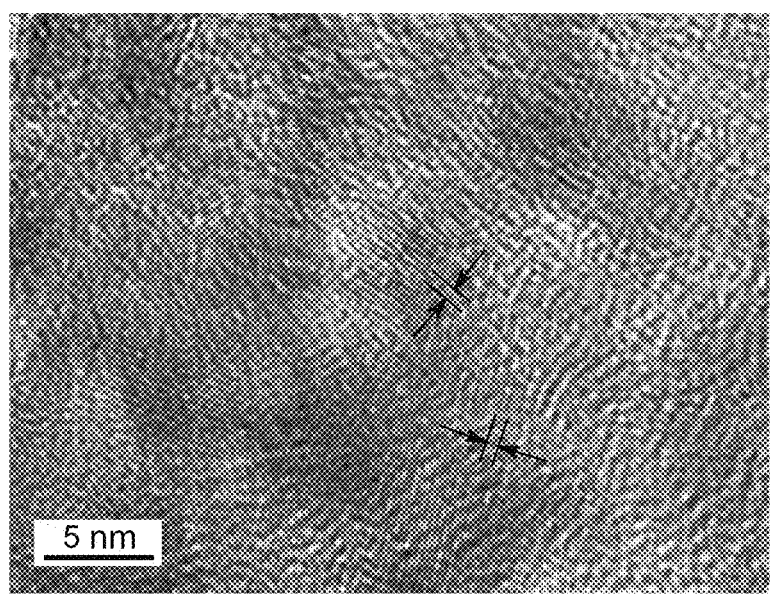
Figure 6G:
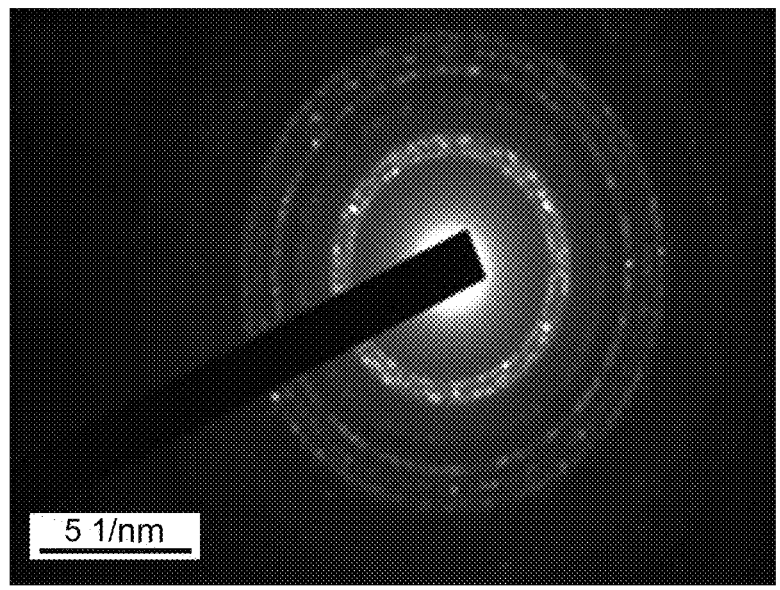
FIG. 6G shows a SAED pattern of the Zn ED-SS, according to certain embodiments.
Figure 6H:
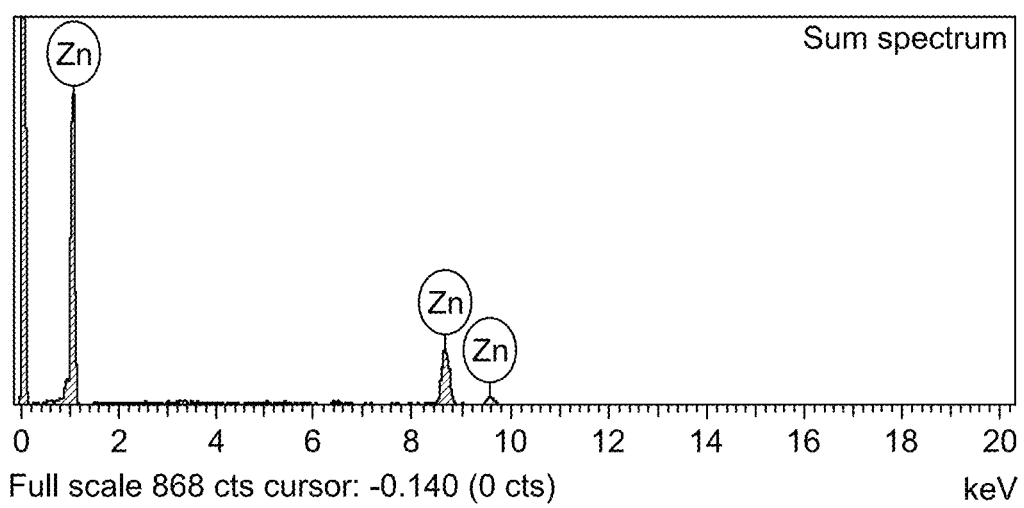
FIG. 6H shows an energy dispersive X-ray spectroscopic (EDS) analysis of the Zn ED-SS, according to certain embodiments.

Further, TEM was employed to examine the microstructure and crystallinity of the Zn ED-SS and the JAC material. FIG. 6A-6C shows transmission electron microscopic (TEM) images of the JAC at different magnifications. The JAC appears to contain evenly distributed nanoparticles. FIG. 6D shows a selected area electron diffraction (SAED) pattern of the JAC Neither the high-resolution transmission electron microscopy (HRTEM) image nor the SAED pattern show any discernible atomic arrangement, and they lack distinct, well-defined diffraction rings. This further indicates that the synthesized JAC is amorphous, corroborating the XRD analysis results. FIG. 6E-6F shows TEM images of the Zn ED-SS at different magnifications. It illustrates that the ultrathin Zn nanosheets exhibit layered structures. FIG. 6G shows a SAED pattern of the Zn ED-SS. The dispersive diffraction rings are visible in the SAED pattern confirming the high crystallinity of the electrodeposited Zn nanosheets. This observation is consistent with the diffraction peaks observed in the XRD pattern. FIG. 6H shows an EDS analysis of the Zn ED-SS. The presence of electrodeposited Zn film on SS is confirmed by the EDS analysis.

Figure 7A:
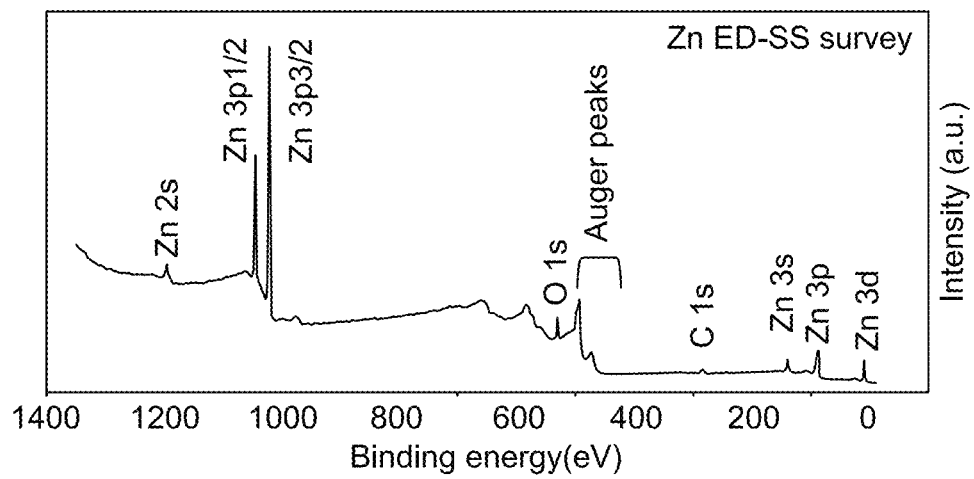
FIG. 7A is an X-ray photoelectron spectroscopy (XPS) survey spectrum for the Zn ED-SS, according to certain embodiments.
Figure 7B:
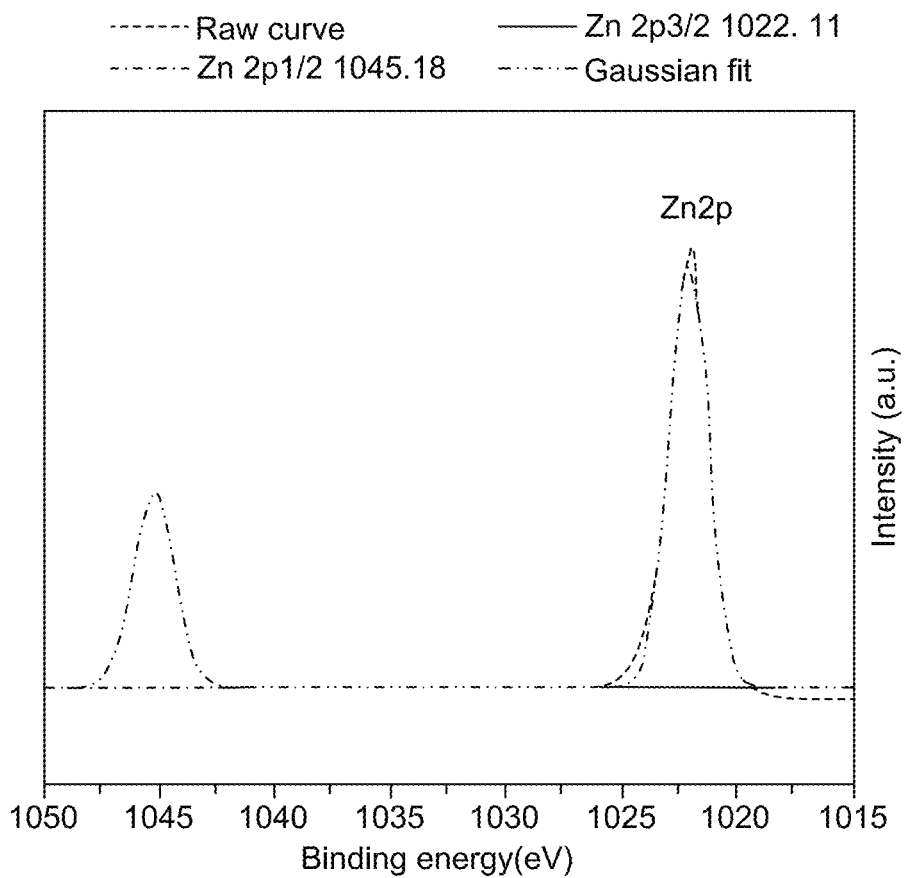
FIG. 7B shows a high-resolution XPS spectrum for Zn 2p for the Zn ED-SS, according to certain embodiments.
Figure 7C:
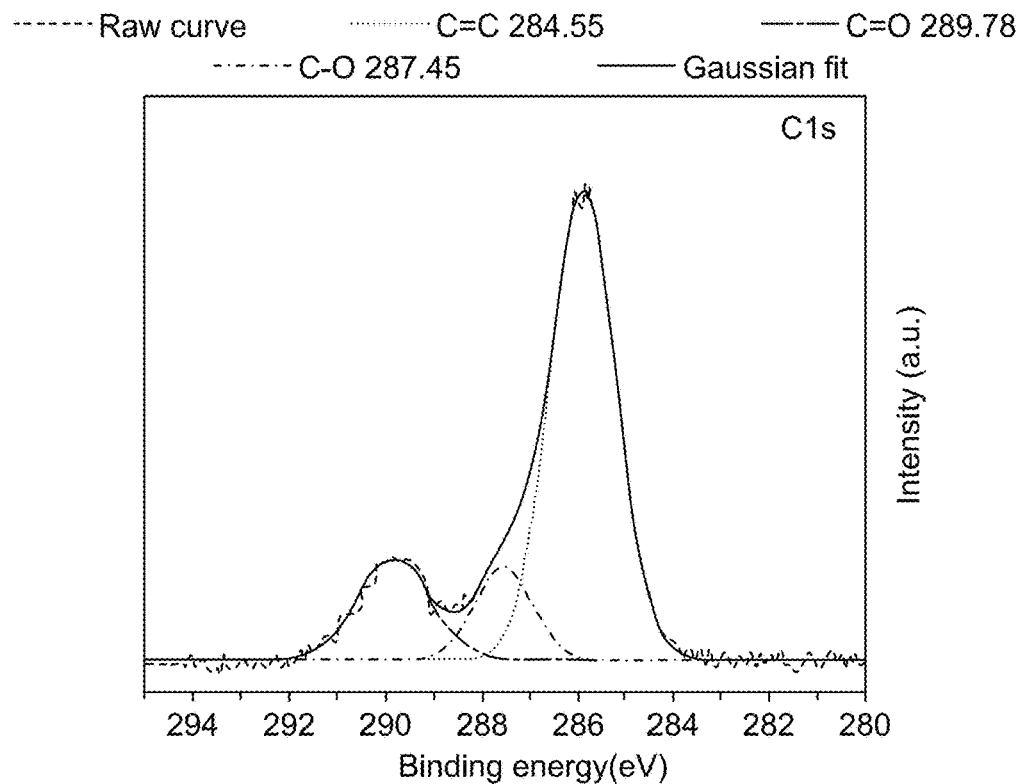
FIG. 7C shows a high-resolution XPS spectrum for C is for the Zn ED-SS, according to certain embodiments.
Figure 7D:
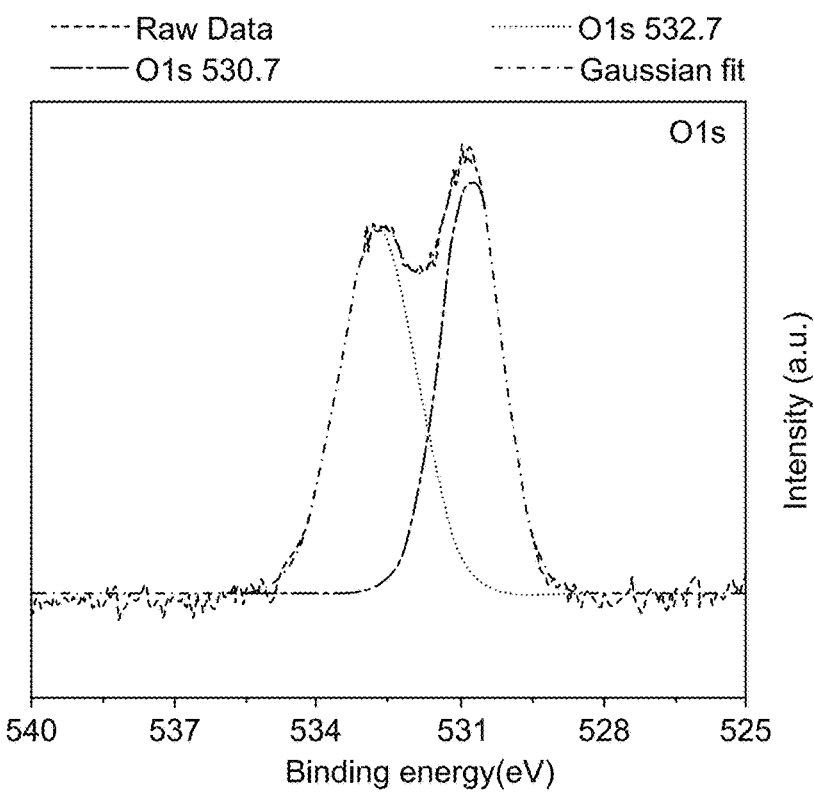
FIG. 7D shows a high-resolution XPS spectrum for O is for the Zn ED-SS, according to certain embodiments.
Figure 7E:
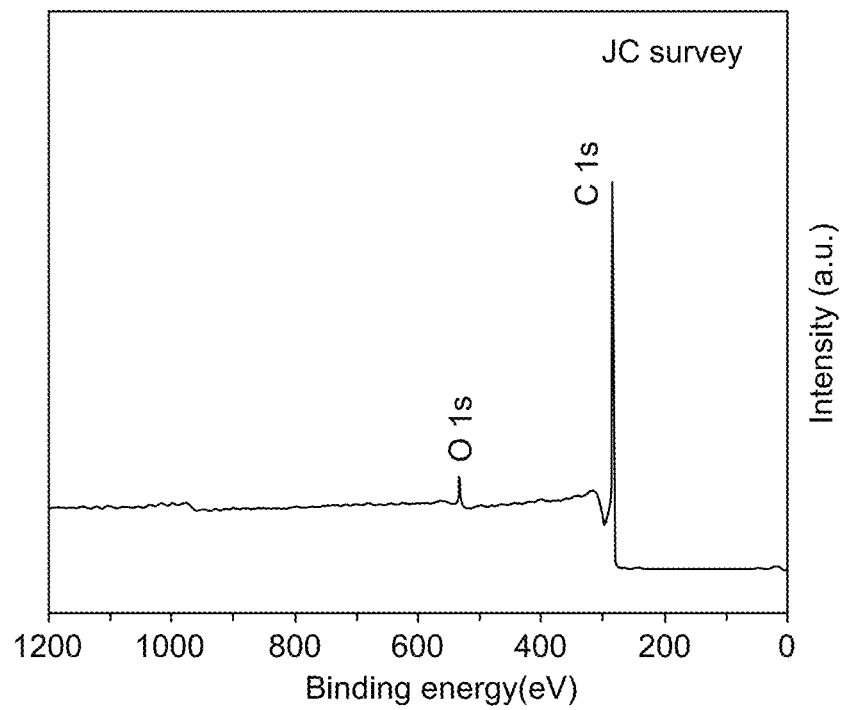
FIG. 7E shows an XPS survey spectrum for the JAC, according to certain embodiments.
Figure 7F:
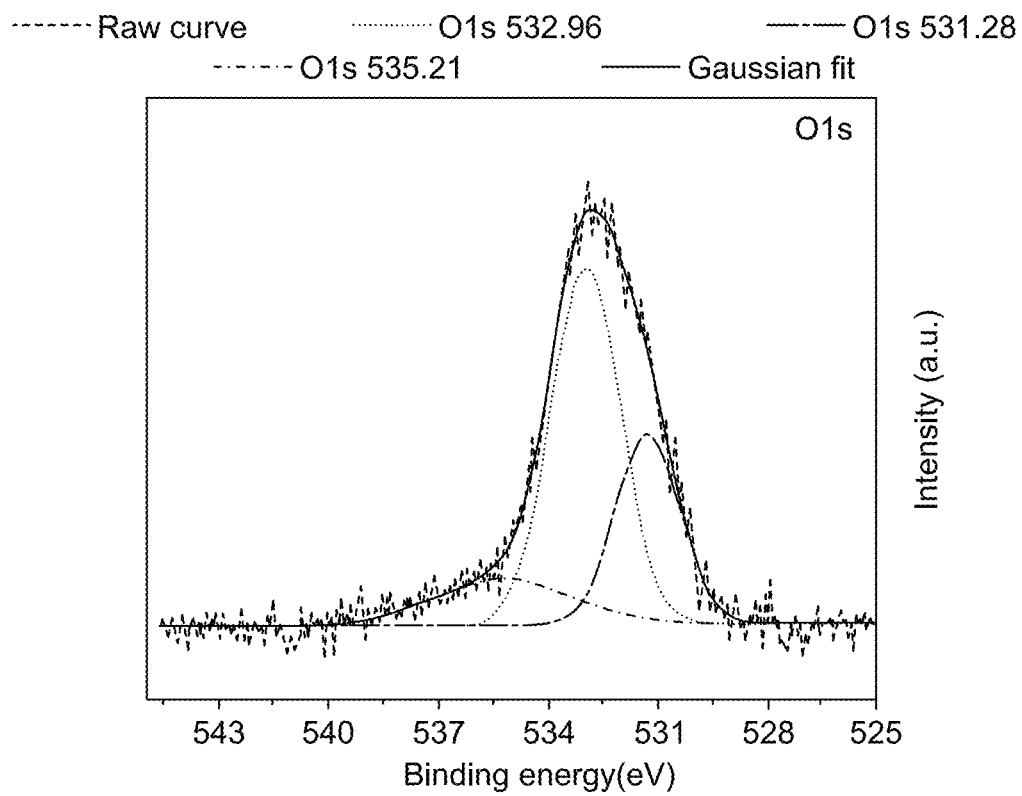
FIG. 7F shows a high-resolution XPS spectrum for O is for the JAC, according to certain embodiments.
Figure 7G:
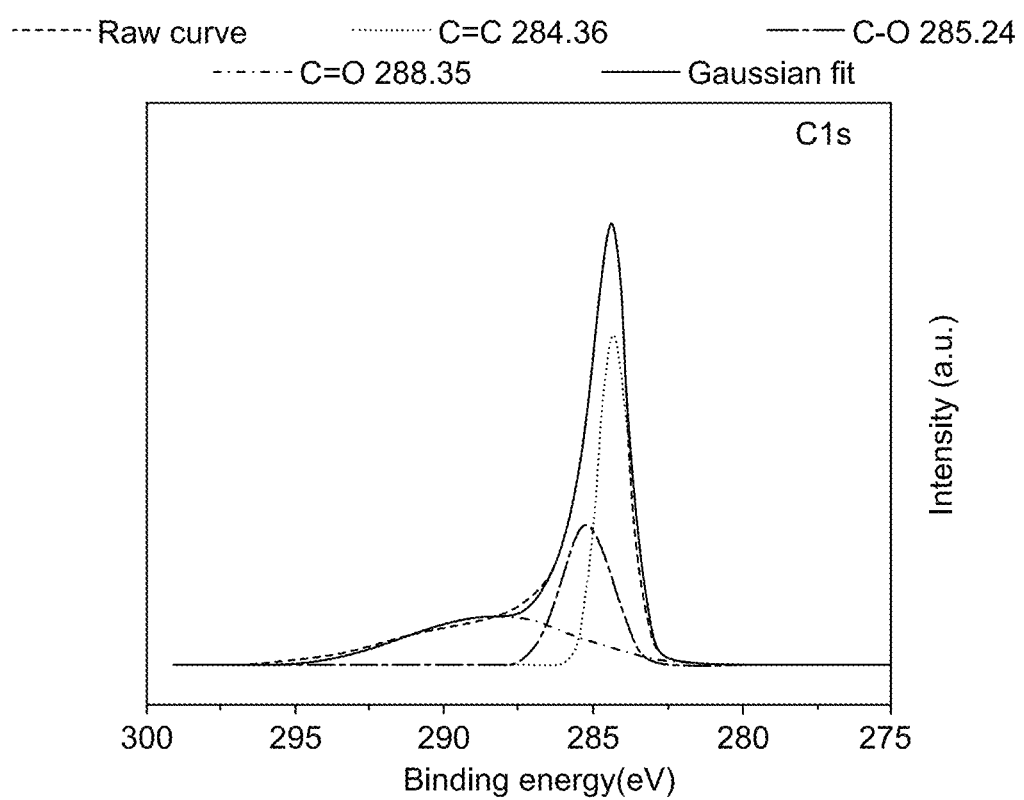
FIG. 7G shows a high-resolution XPS spectrum for C is for the JAC, according to certain embodiments.

Further test on the elemental and chemical state of the Zn ED-SS and the JAC was done using XPS. FIG. 7A illustrates the survey scan for Zn anode, and there are elements including Zn, carbon, and oxygen. As displayed in FIG. 7B, the binding energies of Zn $2p_{3/2}$ are found to be at 1022.11 eV and Zn $2p_{1/2}$ is centered at 1045.18 eV in the high-resolution spectra of Zn 2p. The spectrum of C1s contains three peaks at 284.55 eV, 287.45 eV, and 289.78 eV (FIG. 7C,) indexed to C=C ($sp^2$), C—O, and C=O. O1s in FIG. 7D is broad and asymmetric. The reason for presence the of carbon could be carbon in steel mesh. The high-resolution O1s spectrum shows the first peak at 530.7 eV, whereas the second at 532.7 eV. The presence of little oxygen might have come from aerial oxidation of a small amount of oxygen during the drying of the Zn film in the air. According to the XPS investigation spectrum revealed in FIG. 7E for the JAC, the main constituents in the JAC are C and O. The high-resolution O1s spectrum showed the presence of three peaks at 532.96 eV, 531.28 eV and 535.21 eV (FIG. 7F), and for C1s showed three peaks at 284.36 eV, 285.24 eV, and 288.35 eV (FIG. 7G).

The electrochemical measurements for ZIHSCs, which included CV, EIS, GCD, and stability tests at various current densities, demonstrated improved results compared to the use of Zn foil. Zn foil often experiences issues such as dendrite formation and surface passivation, which can be reduced by the method of the present disclosure. The CV experiment for the coin cell involves applying a potential window ranging from 0.2 to 1.8 V at various scan rates, including 10, 20, 30, 50, 80, 100, 150, 200 (mv·s$^{-1}$) and GCD at different current densities, including 0.1, 0.2 0.3, 0.5, 1, and 2 Ag$^{-1}$.

Figure 8A:
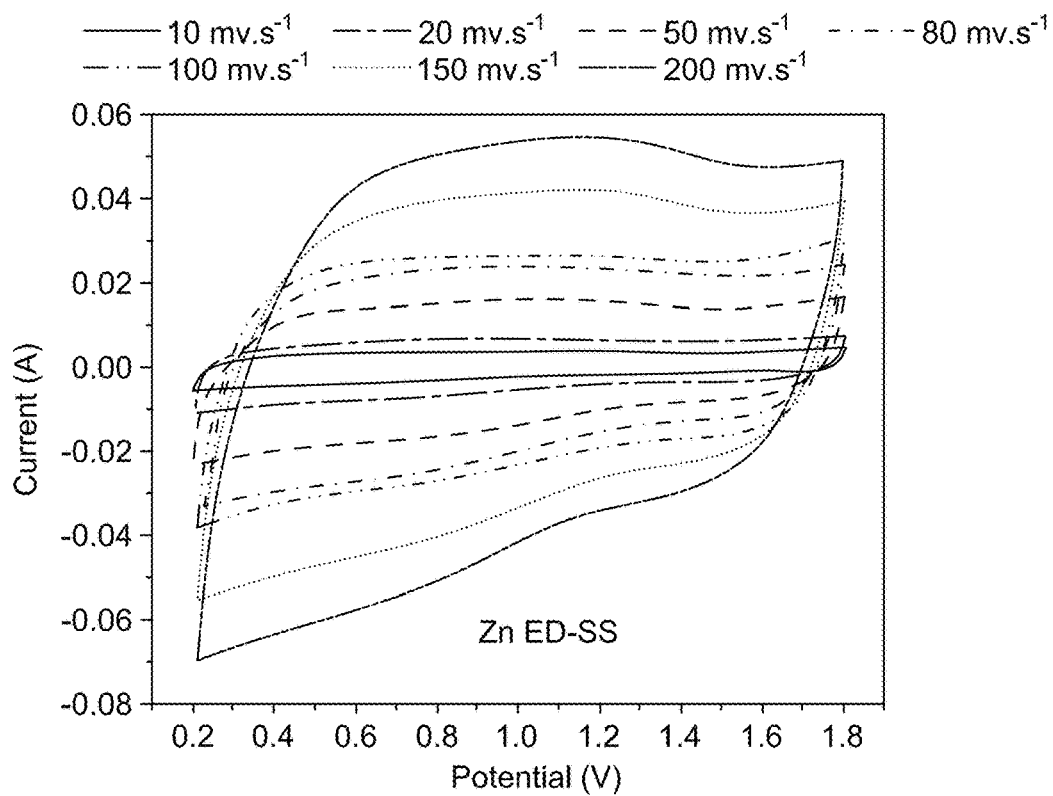
FIG. 8A shows cyclic voltammetry (CV) curves for the Zn ED-SS at different scan rates, according to certain embodiments.
Figure 8B:
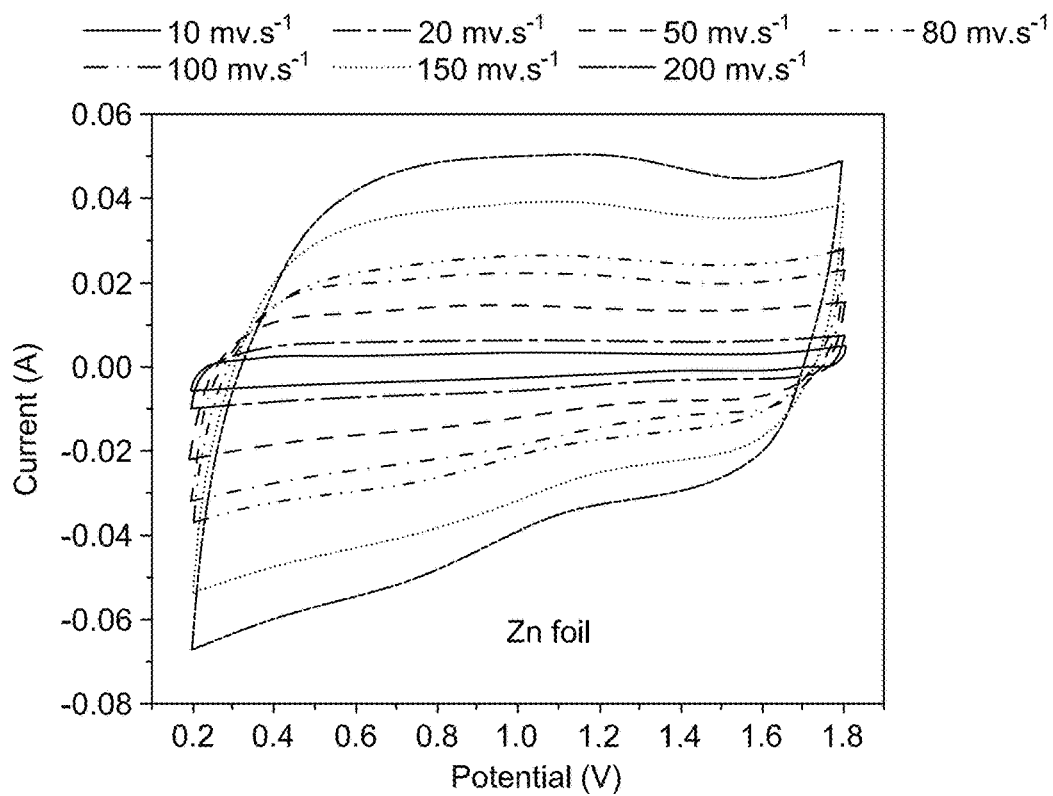
FIG. 8B shows CV curves for the Zn foil anode at different scan rates, according to certain embodiments.
Figure 8C:
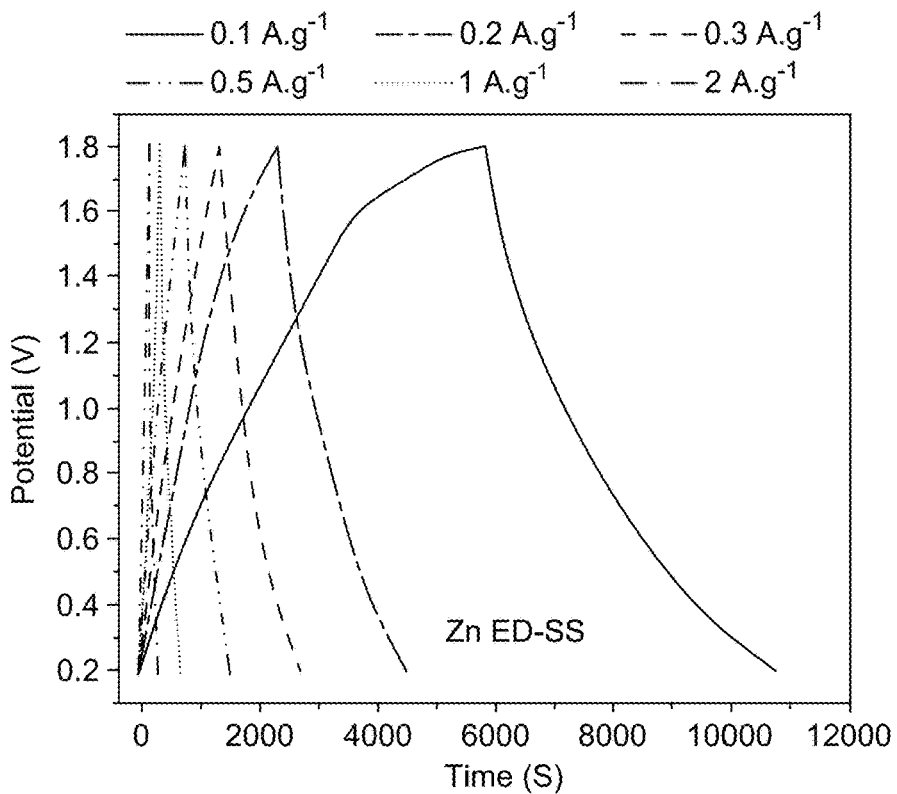
FIG. 8C shows galvanostatic charge-discharge (GCD) curves for the Zn ED-SS at different scan rates, according to certain embodiments.
Figure 8D:
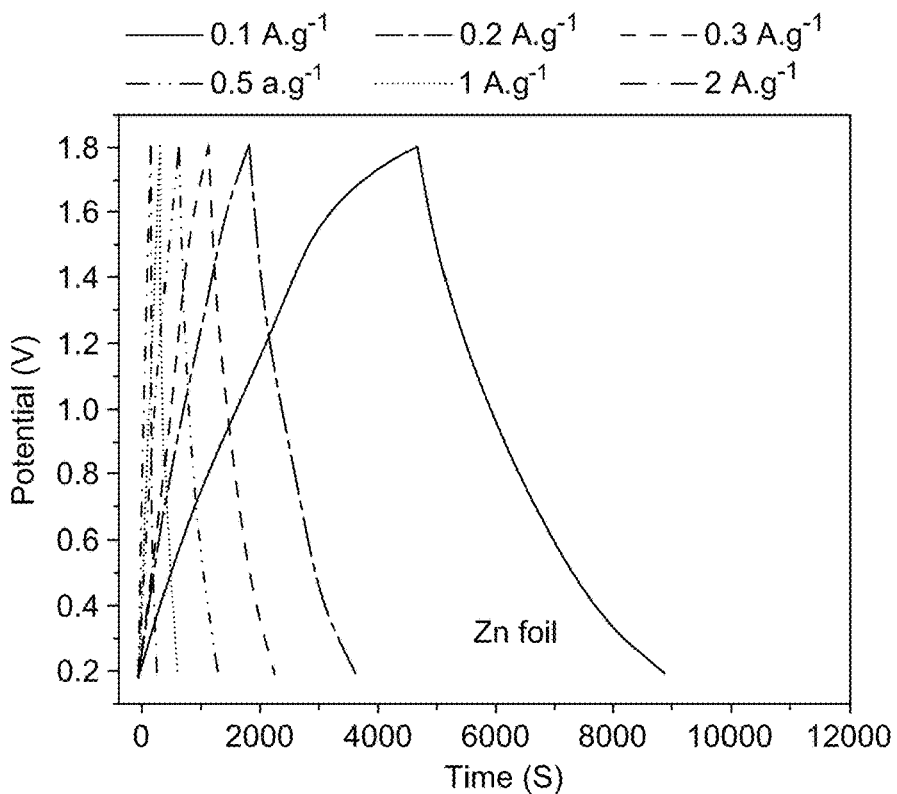
FIG. 8D shows GCD curves for the Zn foil anode at different scan rates, according to certain embodiments.
Figure 8E:
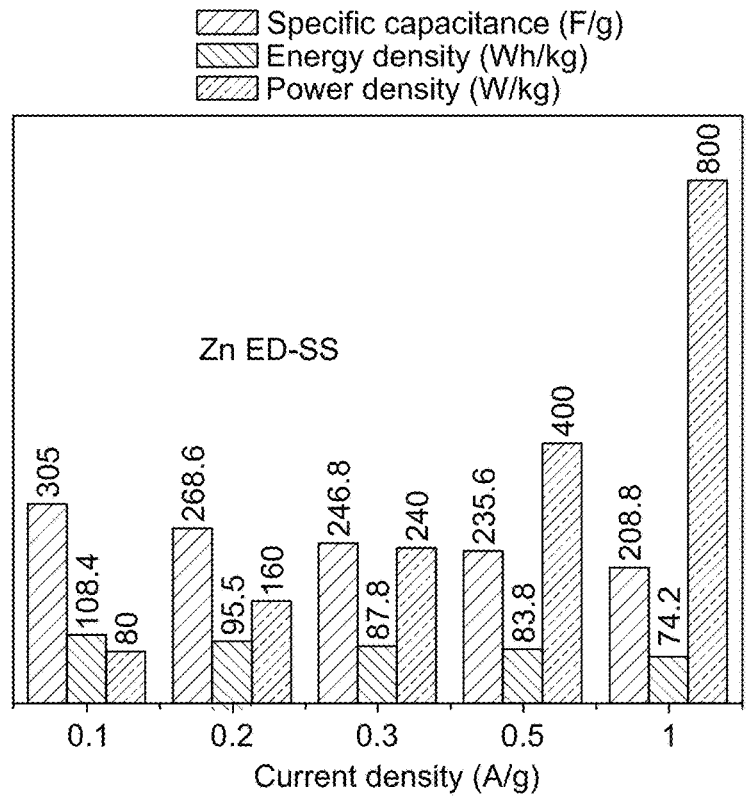
FIG. 8E shows values for the capacitance, energy density, and power density for the Zn ED-SS at various current densities, according to certain embodiments.
Figure 8F:
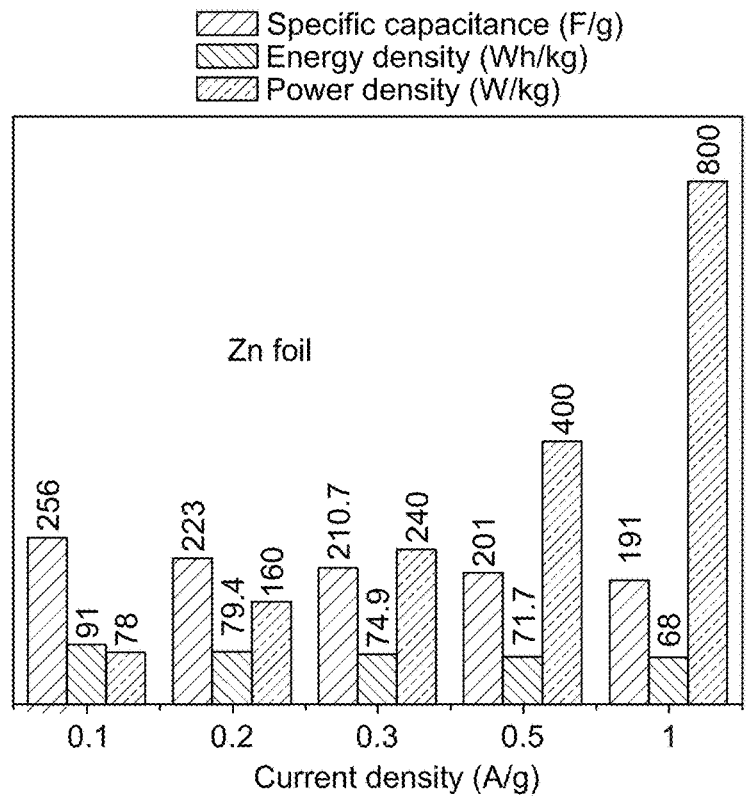
FIG. 8F shows values for the capacitance, energy density, and power density for the Zn foil anode at various current densities, according to certain embodiments.

FIG. 8A and FIG. 8B shows CV curves for the Zn ED-SS and the Zn foil anode at different scan rates. These curves exhibit the typical behavior of a pseudo capacitor characteristic for the Zn ED-SS//the JAC-GrF with two small peaks for the oxidation and reduction of Zn at the anode. The CV curves show consistent shapes and redox behavior, indicating a defined cyclic voltammetric behavior. The shapes of the curves remain intact without any noticeable distortion as the scan rates are increased. Additionally, higher scan rates result in a substantial increase in both the area of the curve and specific capacitance. Overall, the observed behavior in the CV curves showed the effective performance of the Zn ED-SS//the JAC-GrF hybrid supercapacitor with stable and improved electrochemical characteristics. FIG. 8C and FIG. 8D shows GCD curves for the Zn ED-SS and the Zn foil anode at different scan rates. FIG. 8E and FIG. 8F show values for the capacitance, energy density, and power density for various current densities. The Zn ED-SS//the JAC-GrF device can convey a high specific capacitance of 305 Fg$^{-1}$ at 0.1 Ag$^{-1}$ and sustain at 208.8 Fg$^{-1}$ at 1 Ag$^{-1}$.

Figure 9A:
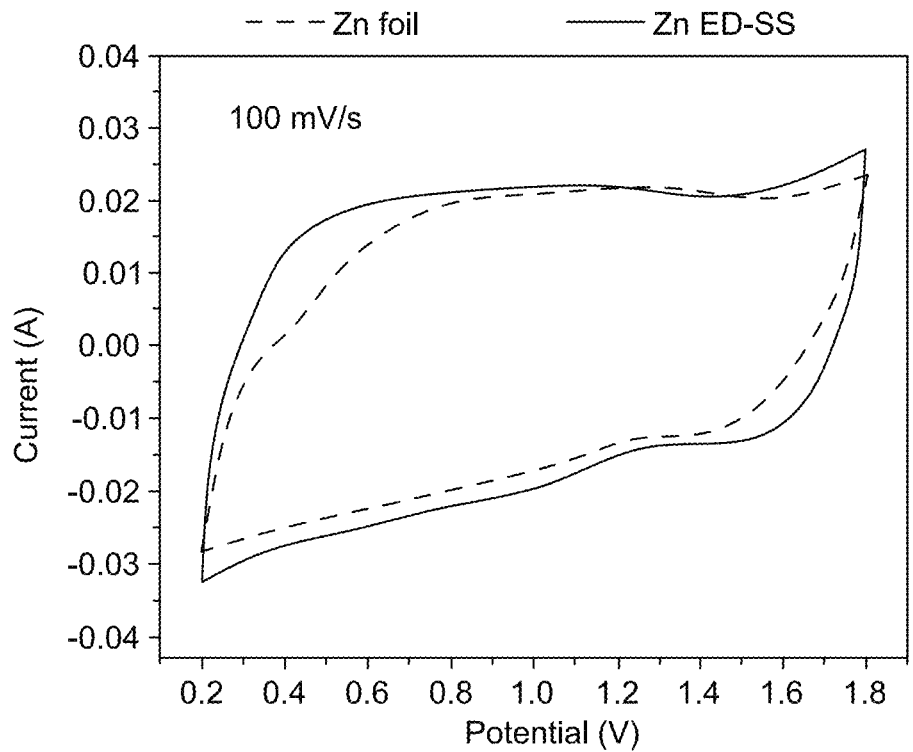
FIG. 9A shows CV curves for the Zn ED-SS and Zn foil anode in the ZIHSC devices at 100 mV/s, according to certain embodiments.
Figure 9B:
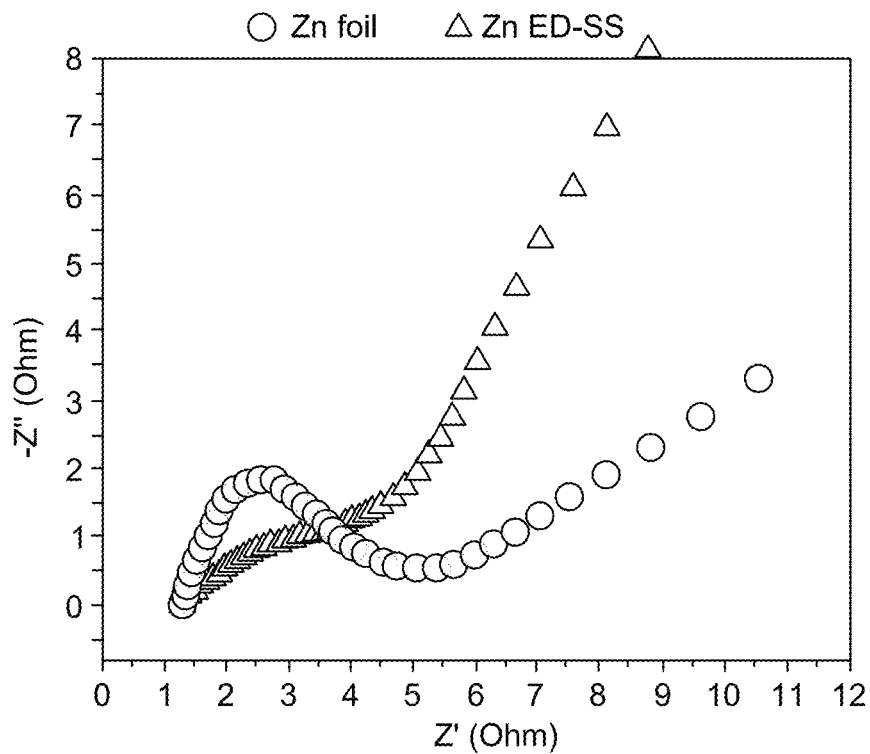
FIG. 9B shows electrochemical impedance spectroscopic (EIS) curves for the Zn ED-SS and Zn foil anode in the ZIHSC devices, according to certain embodiments.
Figure 9C:
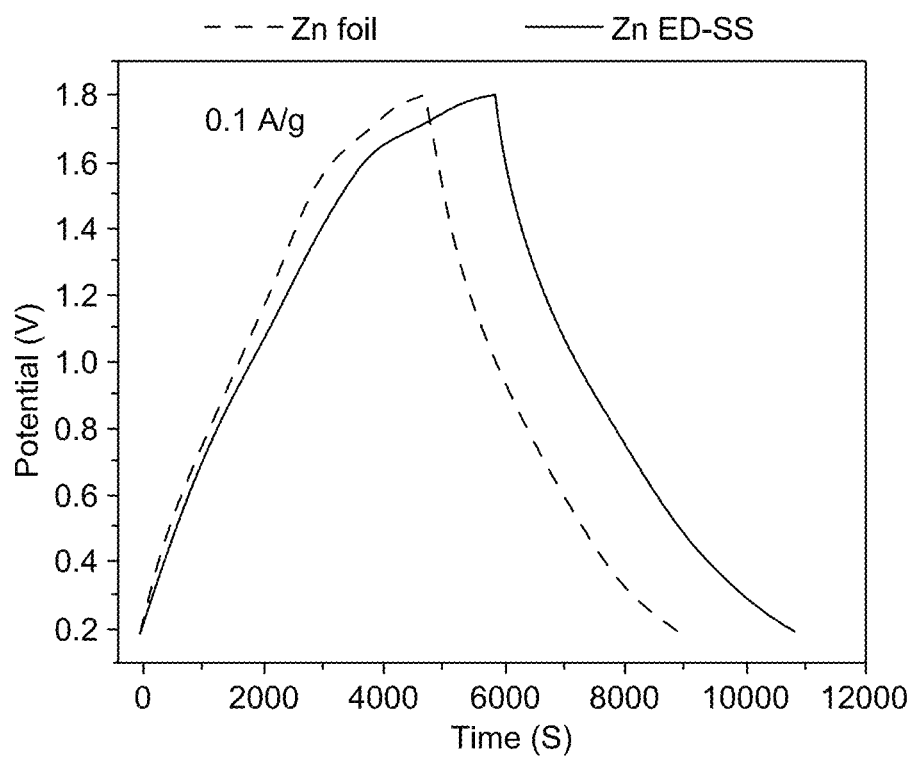
FIG. 9C shows GCD curves for the Zn ED-SS and Zn foil anode in the ZIHSC devices at a current density of 0.1 $Ag^{-1}$, according to certain embodiments.

FIG. 9A shows CV curves for the Zn ED-SS and Zn foil anode in the ZIHSC devices at 100 mV/s. The Zn ED-SS exhibits the largest enclosed CV area, indicating the biggest specific capacitance. FIG. 9B shows EIS curves for the Zn ED-SS and Zn foil anode in the ZIHSC devices. As a result of its unique morphology, the Zn ED-SS offers lower diffusion resistance at a low-frequency range than Zn foil. FIG. 9C shows GCD curves for the Zn ED-SS and Zn foil anode in the ZIHSC devices at a current density of 0.1 Ag$^{-1}$. It was observed that the Zn ED-SS shows a longer discharge time, indicating a higher specific capacitance of 305 Fg$^{-1}$ at 0.1 Ag$^{-1}$ compared to 256 Fg$^{-1}$ for Zn foil. Additionally, the Zn ED-SS displays an energy density of 108.4 Wh kg$^{-1}$, whereas Zn foil shows 91 Wh kg$^{-1}$ at 0.1 Ag$^{-1}$. This enhancement can be attributed to the larger surface area of the electrode, derived from both the steel mesh and the Zn nanosheets. These features provide more active sites for energy storage, allowing the Zn ED-SS to outperform Zn foil.

Figure 9D:
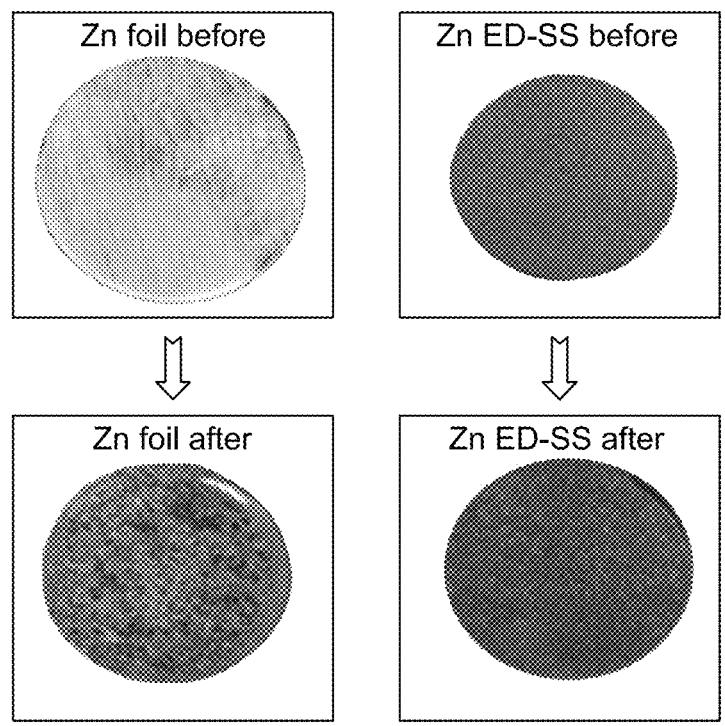
FIG. 9D shows an optical image of the Zn ED-SS and Zn foil after and before 10,000 cycles, according to certain embodiments.

FIG. 9D presents optical images of the Zn ED-SS and Zn foil before and after 10,000 cycles. Zn foil exhibits dendrite formation, unlike the Zn ED-SS. This discrepancy can be attributed to the nanosheet structure of the Zn ED-SS, which offers a larger surface area. Consequently, Zn ions diffuse evenly on the surface during charge and discharge, preventing them from accumulating over one another, as observed in the case of Zn foil.

Figure 10A:
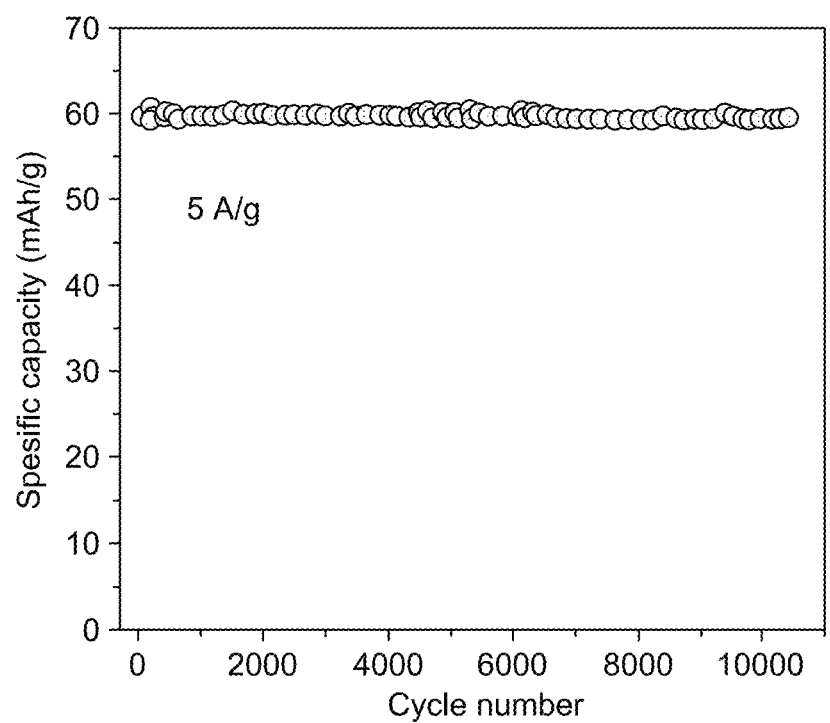
FIG. 10A shows a stability test for 10,000 cycles at a current density of 5 A/g for the Zn ED-SS//jute-activated carbon-coated graphite substrate (JAC-GrF) with zinc sulfate ($ZnSO_4$) electrolyte, according to certain embodiments.
Figure 10B:
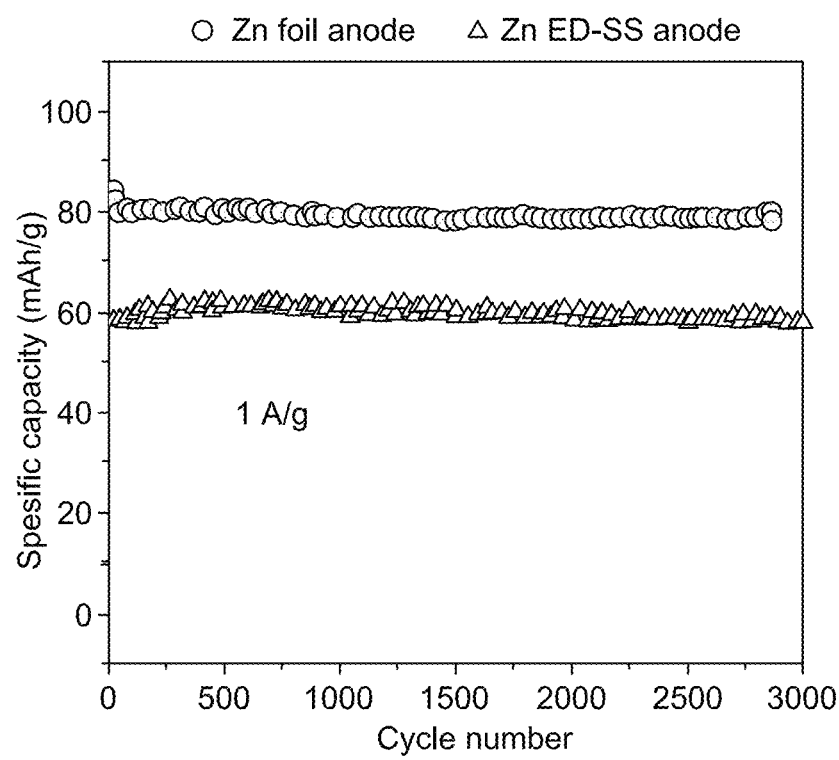
FIG. 10B shows a stability test for the Zn ED-SS and Zn foil at a current density of 1 A/g with $ZnSO_4$ electrolyte, according to certain embodiments.
Figure 10C:
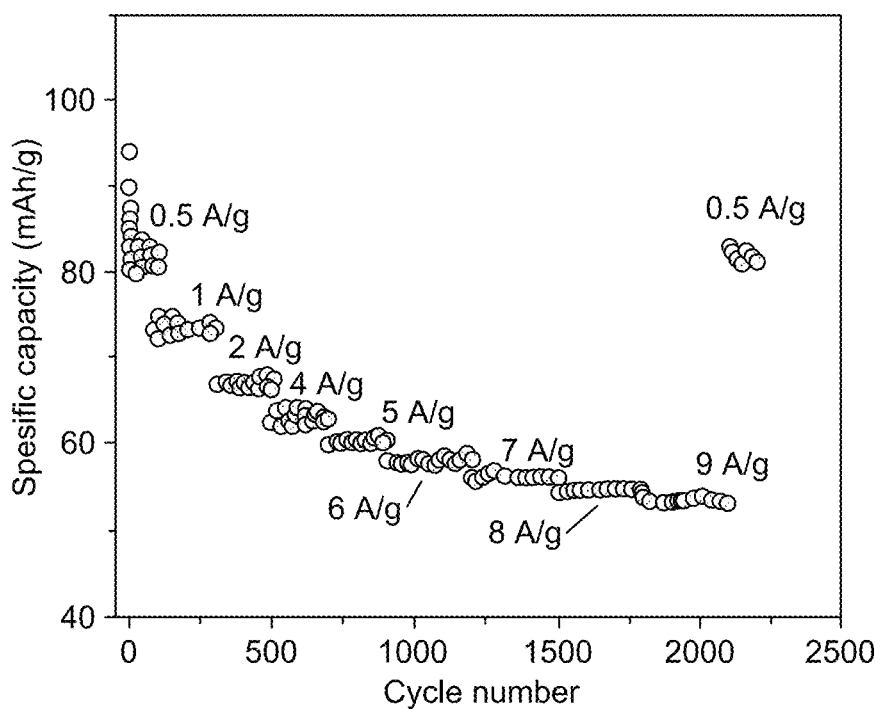
FIG. 10C shows a plot illustrating rate performance for the Zn ED-SS at different current densities, according to certain embodiments.
Figure 10D:
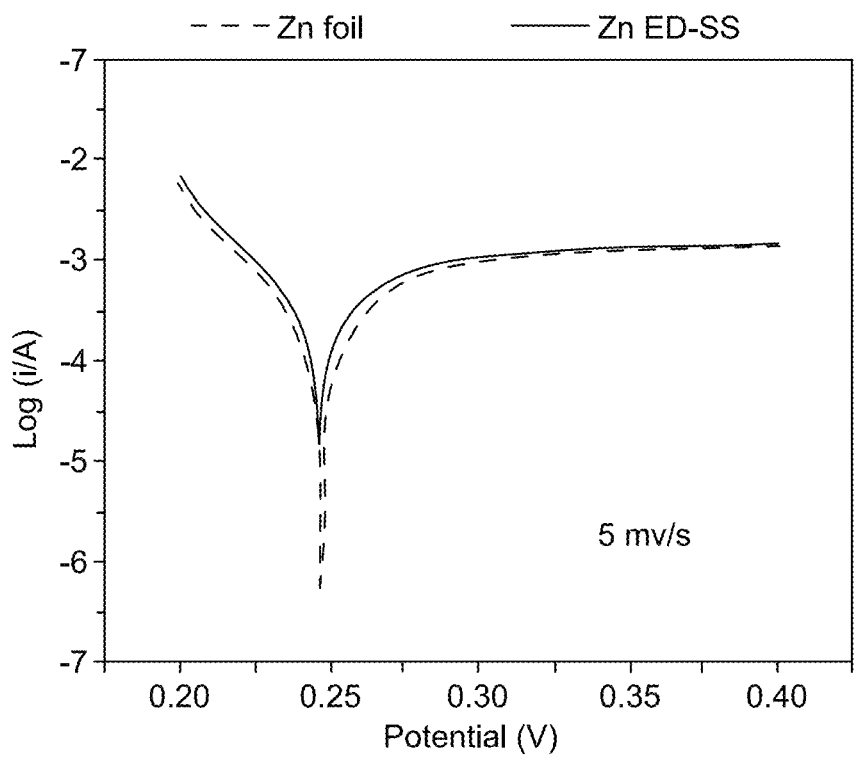
FIG. 10D shows a Tafel plot for Zn foil and the Zn ED-SS, according to certain embodiments.

A component of the electrochemical capacitor is its long cycle life. FIG. 10A shows a stability test for 10,000 cycles at a current density of 5 A/g for Zn ED-SS//jute-activated carbon-coated graphite substrate (JAC-GrF) with $ZnSO_4$ electrolyte. The Zn ED-SS anode achieved a favorable specific capacity of 60 mAh g$^{-1}$ at 5 Ag$^{-1}$ after 10,000 cycles, outperforming Zn foil anodes. FIG. 10B shows a stability test for Zn ED-SS and Zn foil at a current density of 1 A/g with $ZnSO_4$ electrolyte. The specific capacity of the Zn ED-SS reached 80 mAh g$^{-1}$ at 0.5 Ag$^{-1}$ compared to 60 mAh g$^{-1}$ for the Zn foil, attributed to the formation of Zn nanosheets on the steel mesh surface, which increases the surface area and lowers the current density. FIG. 10C shows rate performance for Zn ED-SS at different current densities. These findings highlight the advantages of the Zn ED-SS, providing higher specific capacity, improved cycling stability, and enhanced rate performance. FIG. 10D shows a Tafel plot for Zn foil and Zn ED-SS. It shows that the corrosion current of the Zn ED-SS anode (0.226 mAcm$^{-2}$) is like that of the Zn foil anode (0.153 mAcm$^{-2}$), and they both exhibit the same corrosion potential (0.246 V). This observation shows that the Zn ED-SS anode undergoes corrosion reactions comparable to those commercial Zn foil.

Table 1 shows a comparative analysis of the electrochemical capabilities of ZIHSCs between the present disclosure and previous literature. Comparing the findings on the Zn ED-SS//the JAC-GrF with previous literature which use Zn foil and various carbon materials, it was observed that the study demonstrates superior energy density and capacitance. Specifically, an energy density of 108.4 WhKg$^{-1}$ and a capacitance of 305 Fg$^{-1}$ at 0.1 Ag$^{-1}$ was achieved. Moreover, employing the Zn ED-SS as a substitute for Zn foil brings cost-reduction benefits through decreased Zn consumption.

TABLE 1

A comparative analysis of the electrochemical capabilities of ZIHSCs between this study and existing literature.

| Retention (number of cycles) | Power density | Capacitance | Energy density (Power) Wh kg$^{-1}$ | Voltage range [V] | Cathode | Electrolyte | Anode | Ref. |
|---|---|---|---|---|---|---|---|---|
| 91% (20,000 cycles) at 2 Ag$^{-1}$ | 1725 W kg$^{-1}$ | 170 Fg$^{-1}$ at 0.1 Ag$^{-1}$ | 52.7 | 0-1.8 | Coconut shells activated carbon | 1M Zinc triflate | Zn foil | H. Wang, M. Wang, Y. Tang, A novel zinc-ion hybrid supercapacitor for long-life and low-cost energy storage applications, Energy Storage Materials 13 (2018) 1-7. |
| 87.6% (10 000 cycles) | 3.8 kWkg$^{-1}$ | 299 Fg$^{-1}$ at 0.2 Ag$^{-1}$ | 82 | 0.2-1.8 | Porous carbon | ZnSO$_4$/gelatin hydrogel | Zn foil | Y. Zheng, W. Zhao, D. Jia, Y. Liu, L. Cui, D. Wei, R. Zheng, J. Liu, Porous carbon prepared via combustion and acid treatment as flexible zinc-ion capacitor electrode material, Chemical Engineering Journal 387 (2020) 124161. |
| 98% (15,000 cycles) at 1 Ag$^{-1}$ | 450 W kg$^{-1}$ | 174 Fg$^{-1}$ at 0.5 Ag$^{-1}$ | 60 | 0.15-1.95 | Co-polymer derived hollow carbon spheres | ZnSO$_4$/poly-acrylamide hydrogel | Zn-CC | S. Chen, L. Ma, K. Zhang, M. Kamruzzaman, C. Zhi, J. A. Zapien, A flexible solid-state zinc ion hybrid supercapacitor based on co-polymer derived hollow carbon spheres, Journal of Materials Chemistry A 7(13) (2019) 7784-7790 |
| 91% (10,000 cycles) | 14.9 kWkg$^{-1}$ | 272 Fg 1 at 0.1 Ag$^{-1}$ | 84 | 0.2-1.8 | Activated carbon | 2M (ZnSO$_4$) | Zn foil | L. Dong, X. Ma, Y. Li, L. Zhao, W. Liu, J. Cheng, C. Xu, B. Li, Q.-H. Yang, F. Kang, Extremely safe, high-rate and ultralong-life zinc-ion hybrid supercapacitors, Energy Storage Materials 13 (2018) 96-102 |
| 82% (15,000 cycles) | 4500 Wkg$^{-1}$ | 210.2 Fg$^{-1}$ | 94.6 | 0-1.8 | N/P co-doped graphene | 1M ZnSO$_4$ | Zn foil | Y. Zhao, H. Hao, T. Song, X. Wang, C. Li, W. Li, High energy-power density Zn-ion hybrid supercapacitors with N/P co-doped graphene cathode, Journal of Power Sources 521 (2022) 230941 |
| 94% (10,000 cycles) at 5 Ag-1 | 80 W kg$^{-1}$ | 305 Fg$^{-1}$ at 0.1Ag$^{-1}$ | 108.4 at 0.1 Ag$^{-1}$ | 0.2-1.8 | JAC | 2 M ZnSO4 | Zn ED-SS | This work |

To summarize, ZIHSCs were developed with improved electrochemical performance by utilizing the Zn ED-SS as the positive electrode. A large specific surface area and nanostructure of the Zn electrode provided ample sites for charge storage. In an aqueous electrolyte, the Zn ED-SS//the JAC-GrF device demonstrated an impressive energy density of 108.4 Wh kg$^{-1}$ and power density 80 W kg$^{-1}$ and specific capacitance of 305 Fg$^{-1}$ at 0.1 Ag$^{-1}$. Additionally, it demonstrated exceptional cycle stability, keeping 94% of its capacitance after 10,000 cycles. An aspect of this study was the utilization of the natural structure of biomass to achieve simultaneous carbonization and high porosity. By capitalizing on the advantages of natural biomass, such as its well-defined porous structures, abundance, and wide availability, the present disclosure provides a method for Zn ED and the use of biomass-derived carbon-based electrodes to address the growing demand for energy storage devices.

Numerous modifications and variations of the present disclosure are possible in light of the above teachings. It is therefore to be understood that within the scope of the appended claims, the invention may be practiced otherwise than as specifically described herein.

The invention claimed is:

1. A zinc (Zn) ion hybrid supercapacitor (ZIHSC) in the form of an electrochemical cell, including:
   a Zn nanosheets electrodeposited metal substrate (Zn ED-MS) as an anode;
   a jute activated carbon coated conductive carbon substrate (the JAC-CCS) as a cathode;
   an electrolyte including an aqueous solution of a Zn salt at a concentration of 0.05 to 5 molars (M); and
   a membrane as a separator, wherein the membrane separates the anode from the cathode.

2. The ZIHSC of claim 1, wherein the Zn ED-MS includes:
   a metal substrate; and
   hexagon-shaped Zn nanosheets at least partially covering a surface of the metal substrate.

3. The ZIHSC of claim 2, wherein the metal substrate is at least one selected from the group consisting of an aluminum substrate, a nickel substrate, a titanium substrate, a titanium alloy substrate, an aluminum alloy substrate, a magnesium alloy substrate, a nickel alloy substrate, and a steel substrate.

4. The ZIHSC of claim 2, wherein the hexagon-shaped Zn nanosheets have an average thickness of 5 to 150 nanometers (nm), and an average length of 3 to 7 micrometers (μm) in a longest dimension.

5. The ZIHSC of claim 2, wherein the hexagon-shaped Zn nanosheets present in the Zn ED-MS are in form of a multilayered structure that are uniformly deposited on the surface of the metal substrate.

6. The ZIHSC of claim 1, wherein the JAC-CCS includes:
   a conductive carbon substrate; and
   a jute activated carbon (the JAC) composition at least partially covering a surface of the conductive carbon substrate.

7. The ZIHSC of claim 6, wherein the conductive carbon substrate is at least one selected from the group consisting of a graphite substrate, an acetylene black substrate, and a graphene substrate.

8. The ZIHSC of claim 6, wherein the JAC composition includes:
about 65 to 85 wt. % of jute activated carbon (the JAC) having an amorphous structure;
about 5 to 25 wt. % of carbon black; and
about 5 to 15 wt. % of a polymer binder, each wt. % based on a total weight of the JAC composition.

9. The ZIHSC of claim 8, wherein the polymer binder is at least one selected from the group consisting of a styrene butadiene rubber, a polyvinylidene fluoride (PVDF), and a polyvinylidene fluoride copolymer.

10. The ZIHSC of claim 8, wherein the JAC composition includes:
about 75 wt. % of the JAC;
about 15 wt. % of carbon black; and
about 10 wt. % of a polyvinylidene fluoride, each wt. % based on the total weight of the JAC composition.

11. The ZIHSC of claim 1, wherein the Zn salt is present in the electrolyte at a concentration of about 2 M.

12. The ZIHSC of claim 1, wherein the Zn salt includes zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate.

13. The ZIHSC of claim 1, wherein the membrane is a microporous polymeric membrane selected from the group consisting of a polyethylene membrane, a polypropylene membrane, and a polyvinyl chloride (PVC) membrane.

14. The ZIHSC of claim 1, having:
an energy density of 98 to 118 watt-hours per kilogram (Wh/kg);
a power density of 70 to 90 watts per kilogram (W/kg); and
a specific capacitance of about 280 to 325 farads per gram (F/g), each measured at a current density of about 0.1 amperes per gram (A/g).

15. The ZIHSC of claim 1, after subjecting to about 10,000 cycles of charging and discharging at a current density of about 5 A/g, wherein the ZIHSC has a capacity retention rate of about 94% based on an initial capacity of the ZIHSC.

16. A method of making the ZIHSC of claim 1, including preparing the Zn ED-MS by:
charging the electrolyte including the Zn salt to an electrochemical cell including a working electrode, a counter electrode, and a reference electrode;
wherein the working electrode is a metal substrate;
immersing the metal substrate into the electrolyte and applying a potential between the metal substrate and the counter electrode in the electrochemical cell via the electrolyte to form Zn nanosheets deposited on a surface of the metal substrate; and
removing the metal substrate including the Zn nanosheets from the electrolyte, washing and drying.

17. The method of claim 16, wherein the electrolyte further includes a sodium salt, and a boric acid.

18. The method of claim 16, wherein the metal substrate is a steel mesh, and wherein the Zn ED-MS is a Zn nanosheets electrodeposited steel substrate (the Zn ED-SS).

19. The method of claim 16, further including preparing the JAC-CCS by:
mixing jute powder, a base, and water to form a first mixture;
calcinating the first mixture at a temperature of about 800° C. to form a second mixture;
washing the second mixture and drying to form the JAC in the form of particles;
dispersing the particles of the JAC, carbon black, and a polymer binder in a solvent and mixing to form a slurry;
applying the slurry on a surface of a conductive carbon substrate, and drying to form a sample; and
drying the sample.

20. The method of claim 19, wherein the polymer binder is a polyvinylidene fluoride (PVDF), and the conductive carbon substrate is a graphite substrate (GrF), and wherein the JAC-CCS a jute activated carbon coated conductive carbon substrate (the JAC-GrF).

* * * * *